(12) United States Patent
Ingemi et al.

(10) Patent No.: US 8,228,046 B2
(45) Date of Patent: Jul. 24, 2012

(54) APPARATUS AND METHOD FOR OPERATING AN UNINTERRUPTIBLE POWER SUPPLY

(75) Inventors: Michael J. Ingemi, Norwood, MA (US); Damir Klikic, Waltham, MA (US)

(73) Assignee: American Power Conversion Corporation, West Kingston, RI (US)

( * ) Notice: Subject to any disclaimer, the term of this patent is extended or adjusted under 35 U.S.C. 154(b) by 445 days.

(21) Appl. No.: 12/485,285

(22) Filed: Jun. 16, 2009

(65) Prior Publication Data
US 2010/0315849 A1 Dec. 16, 2010

(51) Int. Cl.
*G05F 1/00* (2006.01)
(52) U.S. Cl. ........ 323/222
(58) Field of Classification Search ......... 323/222–225, 323/282–283; 363/21.05, 86, 123; 307/64–66
See application file for complete search history.

(56) References Cited

U.S. PATENT DOCUMENTS

| | | |
|---|---|---|
| 4,564,767 A | 1/1986 | Charych |
| 4,673,826 A | 6/1987 | Masson |
| 4,683,529 A | 7/1987 | Bucher, II |
| 4,816,982 A | 3/1989 | Severinsky |
| 4,831,508 A | 5/1989 | Hunter |
| 4,964,029 A | 10/1990 | Severinsky et al. |
| 5,047,913 A | 9/1991 | De Doncker et al. |
| 5,184,025 A | 2/1993 | McCurry et al. |
| 5,602,462 A | 2/1997 | Stich et al. |
| 5,654,591 A | 8/1997 | Mabboux et al. |
| 5,923,103 A | 7/1999 | Pulizzi et al. |
| 5,968,398 A * | 10/1999 | Schmitt et al. ........ 219/626 |
| 5,982,652 A | 11/1999 | Simonelli et al. |
| 6,046,920 A | 4/2000 | Cazabat et al. |
| 6,069,412 A | 5/2000 | Raddi et al. |
| 6,191,500 B1 | 2/2001 | Toy |
| 6,201,371 B1 | 3/2001 | Kawabe et al. |
| 6,215,287 B1 | 4/2001 | Matsushiro et al. |
| 6,330,176 B1 | 12/2001 | Thrap et al. |
| 6,400,591 B2 | 6/2002 | Reilly et al. |
| 6,483,730 B2 | 11/2002 | Johnson, Jr. |
| 6,639,383 B2 | 10/2003 | Nelson et al. |
| 6,728,119 B2 | 4/2004 | Reilly et al. |
| 6,737,840 B2 | 5/2004 | McDonald et al. |
| 6,757,185 B2 | 6/2004 | Rojas Romero |
| 6,838,925 B1 | 1/2005 | Nielsen |
| 6,850,426 B2 * | 2/2005 | Kojori et al. ........ 363/123 |
| 6,853,564 B2 | 2/2005 | Kravitz |

(Continued)

OTHER PUBLICATIONS

International Search Report and Written Opinion from corresponding International Application PCT/US2010/035756 dated Jan. 27, 2011.

(Continued)

*Primary Examiner* — Adolf Berhane
*Assistant Examiner* — Yemane Mehari
(74) *Attorney, Agent, or Firm* — Lando & Anastasi, LLP

(57) ABSTRACT

Systems and methods for operating an uninterruptable power supply are provided. The uninterruptable power supply may include a rectifier that has a transistor and an inductor. The uninterruptable power supply may also include a controller. A current sensor can be configured to detect inductor current and to provide a detected inductor current value to the controller to generate a current error value based and to generate a pulse width modulation control signal based in part on the current error value. The controller can apply the pulse width modulation control signal to the transistor to adjust a switching frequency of the transistor.

18 Claims, 17 Drawing Sheets

U.S. PATENT DOCUMENTS

| | | |
|---|---|---|
| 7,005,759 B2 * | 2/2006 | Ying et al. .................. 307/64 |
| 7,126,409 B2 | 10/2006 | Nielsen |
| 7,239,043 B2 * | 7/2007 | Taimela et al. ............. 307/66 |
| 7,274,112 B2 | 9/2007 | Hjort et al. |
| 7,402,921 B2 | 7/2008 | Ingemi et al. |
| 2002/0130648 A1 | 9/2002 | Raddi et al. |
| 2002/0191425 A1 | 12/2002 | Geissler |
| 2003/0048006 A1 | 3/2003 | Shelter, Jr. et al. |
| 2003/0220026 A1 | 11/2003 | Oki et al. |
| 2004/0160789 A1 | 8/2004 | Ying et al. |
| 2005/0036248 A1 | 2/2005 | Klikic et al. |
| 2005/0168073 A1 | 8/2005 | Hjort |
| 2005/0201127 A1 | 9/2005 | Tracy et al. |
| 2005/0275976 A1 | 12/2005 | Taimela et al. |
| 2005/0278075 A1 | 12/2005 | Rasmussen et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0072262 A1 | 4/2006 | Paik et al. |
| 2006/0238941 A1 | 10/2006 | Ingemi et al. |
| 2006/0279970 A1 | 12/2006 | Kernahan |
| 2007/0055409 A1 | 3/2007 | Rasmussen et al. |
| 2007/0064363 A1 | 3/2007 | Nielsen et al. |
| 2007/0228837 A1 | 10/2007 | Nielsen et al. |
| 2008/0042491 A1 | 2/2008 | Klikic et al. |
| 2008/0061628 A1 | 3/2008 | Nielsen et al. |
| 2008/0067872 A1 | 3/2008 | Moth |
| 2008/0157601 A1 | 7/2008 | Masciarelli et al. |
| 2008/0197706 A1 | 8/2008 | Nielsen |
| 2008/0272744 A1 | 11/2008 | Melanson |
| 2009/039706 A1 | 2/2009 | Kotlyar et al. |
| 2009/0046415 A1 | 2/2009 | Rasmussen et al. |

OTHER PUBLICATIONS

David M. Xu, et al., Quasi Soft-Switching Partly Decoupled Three-Phase PFC With Approximate Unity Power Factor, 1998, pp. 953-957.

* cited by examiner

APPARATUS AND METHOD FOR OPERATING AN UNINTERRUPTIBLE POWER SUPPLY

BACKGROUND OF THE INVENTION

1. Field of Invention

At least one embodiment of the present invention relates generally to control of an uninterruptable power supply input circuit.

2. Discussion of Related Art

Rectifiers and other non-linear loads distort current drawn from a source, which lowers the power factor ratio of various power distribution systems and reduces their efficiency. Reactive elements in these systems can also create harmonic noise when switching between on and off states and at some operating frequencies. Rectifiers that operate inefficiently consume large amounts of power from a source, increasing power supply costs, and can become audible during heavy load conditions, decreasing commercial viability.

SUMMARY OF THE INVENTION

At least one aspect is directed to an uninterruptable power supply that includes an input circuit having a first transistor, a second transistor, and an inductor. The uninterruptable power supply also includes a controller having a digital signal processor and a field programmable gate array. The controller is coupled to the input circuit to detect inductor current and to provide a detected inductor current value to the digital signal processor. The controller can apply a pulse width modulation control signal to one of the first transistor and the second transistor to adjust a switching frequency of one of the first transistor and the second transistor.

At least one aspect is directed to a method of operating an uninterruptable power supply including an input circuit and a controller, the input circuit having a first transistor, a second transistor, and an inductor, and the controller having a digital signal processor and a field programmable gate array. An inductor current of the input circuit is detected and its value provided to the digital signal processor, which can generate a current error value based in part on the detected inductor current value. The method can provide the current error value to the field programmable gate array, which can generate a pulse width modulation control signal based in part on the current error value. The method can apply the pulse width modulation control signal to one of the first transistor and the second transistor to control a switching frequency of one of the first transistor and the second transistor.

At least one aspect is directed to an uninterruptable power supply having an input circuit. The input circuit includes a first transistor, a second transistor, and an inductor. A controller having a digital signal processor and a field programmable gate array is coupled to the input circuit to detect inductor current and to provide a detected inductor current value to the digital signal processor. The uninterruptable power supply further includes means for applying a pulse width modulation control signal to one of the first transistor and the second transistor to adjust a switching frequency of one of the first transistor and the second transistor.

At least one aspect is directed to a system to distribute power to a load. The system includes an input circuit with a first transistor, a second transistor, and an inductor. The system also includes a controller having a digital signal processor and a field programmable gate array coupled to the input circuit to detect inductor current and to provide a detected inductor current value to the digital signal processor. The controller can apply a pulse width modulation control signal to one of the first transistor and the second transistor to adjust a switching frequency of one of the first transistor and the second transistor, and the controller can apply an output voltage to the load.

In some embodiments, the digital signal processor can generate a current error value based in part on the detected inductor current value and can provide the current error value to the field programmable gate array. The field programmable gate array can generate the pulse width modulation control signal based in part on the current error value.

In at least one embodiment, the first transistor may form part of a first boost converter circuit, and the second transistor forms part of a second boost converter circuit. The input circuit may include a three phase rectifier, and the controller may apply the pulse width modulation control signal to the first transistor to switch a mode of operation of the first boost converter circuit between variable frequency just-discontinuous and fixed frequency continuous modes of operation. The controller may apply a second pulse width modulation control signal to the second transistor to switch a mode of operation of the second boost converter circuit between variable frequency just-discontinuous and fixed frequency continuous modes of operation.

In some embodiments, the first boost converter circuit may operate in the variable frequency just-discontinuous mode of operation, and wherein the second boost converter circuit simultaneously operates in the fixed frequency continuous mode of operation. In various embodiments, the controller may apply the pulse width modulation control signal to one of the first transistor and the second transistor to switch an operating mode of one of the first boost converter circuit and the second boost converter circuit between variable frequency just-continuous and fixed frequency continuous modes of operation. In some embodiments, at least one of the first transistor and the second transistor can switch to an on state when the detected inductor current value falls to substantially zero.

In some embodiments, the three phase rectifier can be configured for operation during a line cycle having a first phase voltage, a second phase voltage, and a third phase voltage, and the controller may switch the operating mode of one of the first boost converter circuit and the second boost converter circuit during a part of the line cycle where each of the first phase voltage, the second phase voltage, and the third phase voltage are mutually exclusive. The digital signal processor may generate a voltage error value and to provide the voltage error value to the field programmable gate array, and the field programmable gate array may generate the pulse width modulation control signal based in part on the voltage error value. In at least one embodiment, the input circuit may include a three phase rectifier having a first inductor, a second inductor, and a third inductor, and the detected inductor current may include current from at least two of the first, second, and third inductor.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
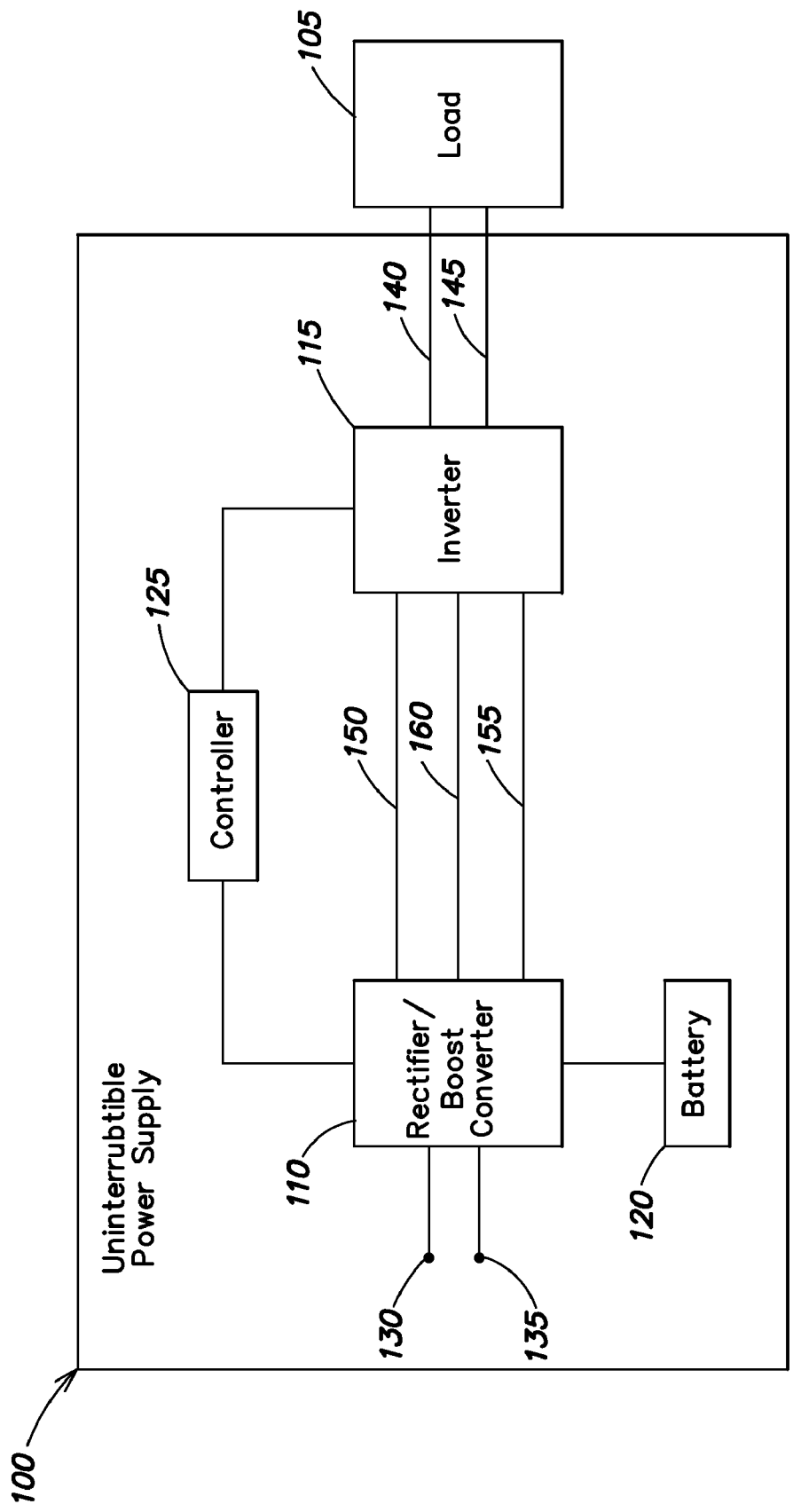
FIG. 1 is a functional block diagram depicting an uninterruptable power supply in accordance with an embodiment of the invention.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Various aspects and embodiments are directed to controlling operating frequency, power factor correction, and total harmonic distortion of systems, uninterruptable power supplies, and to methods of distributing power to a load. As discussed further below, for example, the system may include an input circuit that has a transistor and an inductor. The system may also include a controller. A current sensor can be configured to detect inductor current and to provide a detected inductor current value to the controller to generate a current error value based in part on the detected inductor current and to generate a pulse width modulation control signal based in part on the current error value. The controller can apply the pulse width modulation control signal to the transistor to adjust a switching frequency of the transistor to provide desired circuit operating frequencies, power factor correction, and total harmonic distortion.

FIG. 1 is a functional block diagram of an uninterruptable power supply (UPS) 100 in accordance with an embodiment. In one embodiment, UPS 100 provides power to at least one load 105. UPS 100 may also include at least one input circuit 110, such as a rectifier, (e.g., a buck-boost converter circuit, which may also be referred to as a positive converter and a negative converter, or universally as a boost converter circuit or simply boost converter) at least one inverter 115, at least one battery 120, and at least one controller 125. In one embodiment, UPS 100 includes AC input lines 130 and 135 to couple respectively to line and neutral of an input AC power source. UPS 100 may also include outputs 140 and 145 to provide an output line and neutral to load 105.

In a line mode of UPS 100 operation, in one embodiment under the control of controller 125, input circuit 110 receives input AC voltage from inputs 130 and 135 and provides positive and negative output DC voltages at output lines 150 and 155 with respect to common line 160. In a battery mode of UPS 100 operation, for example upon loss of input AC power, input circuit 110 may generate DC voltages from battery 120. In this example, common line 160 may be coupled to input neutral line 135 and output neutral line 145 to provide a continuous neutral through UPS 100. Inverter 115 receives DC voltages from input circuit 110 and provides output AC voltage at lines 140 and 145.

Figure 2:
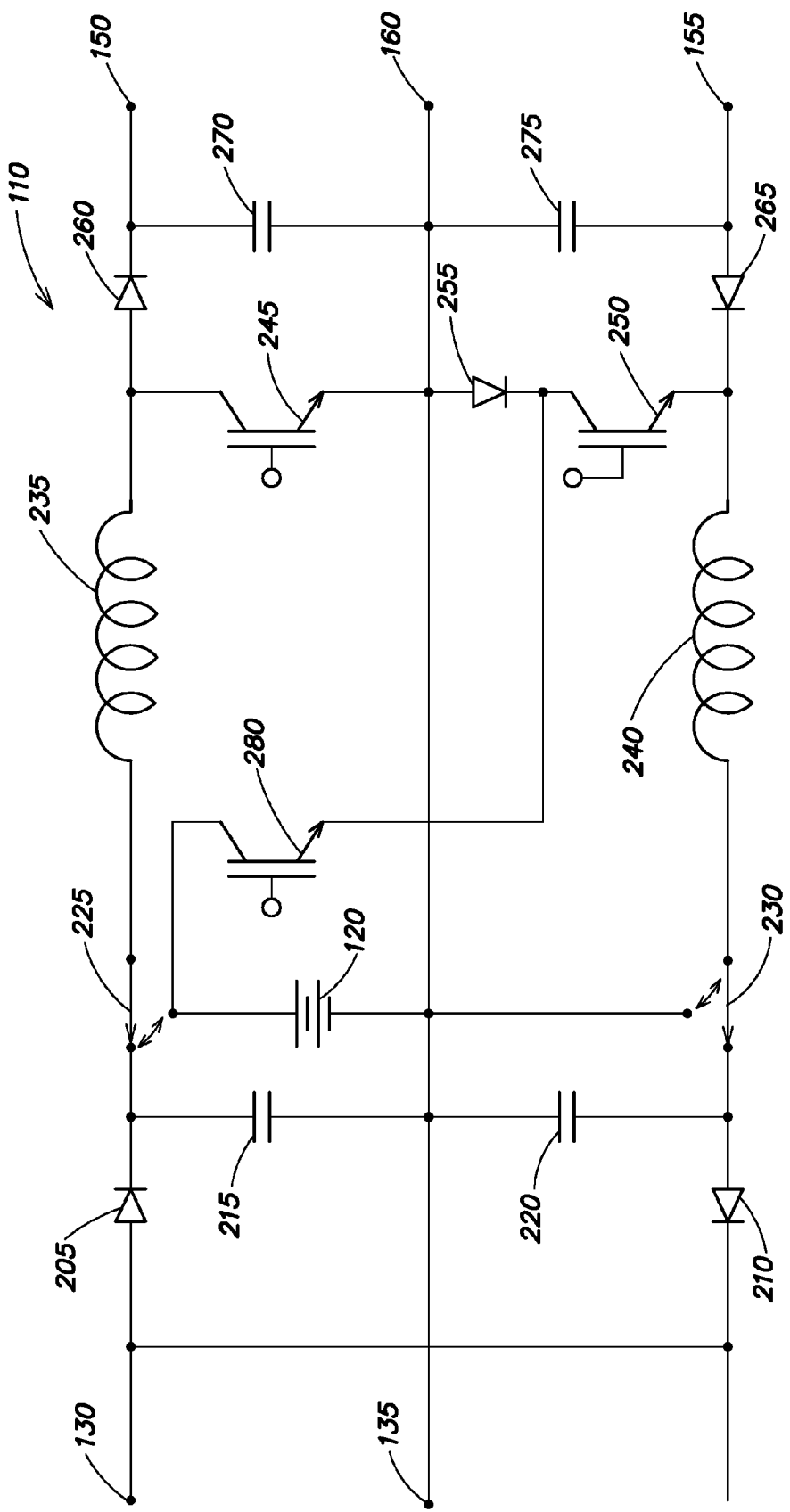
FIG. 2 is a schematic diagram depicting an input circuit in accordance with an embodiment of the invention.

FIG. 2 is a schematic diagram depicting input circuit 110 in accordance with an embodiment of the invention. In one embodiment, input circuit 110 includes input diodes 205 and 210, input capacitors 215 and 220, relays 225 and 230, inductors 235 and 240, boost transistors 245 and 250, diode 255, output diodes 260 and 265, and output capacitors 270 and 275.

As illustrated in FIG. 2, input circuit 110 is configured in a line mode of operation, where relays 225 and 230 are configured to couple AC input lines 130 and 135 with inductors 235 and 240, such that positive and negative rectified voltages are respectively provided to inductors 235 and 240. In one embodiment, inductor 235 operates in conjunction with transistor 245 and output diode 260 as a positive boost converter under control of a controller such as controller 125 (not illustrated in FIG. 2), using pulse width modulation to provide a positive DC voltage across output capacitor 270. In this example, transistor 245 operates as a positive boost transistor. Analogously, in one embodiment, inductor 240 operates in conjunction with transistor 250 and output diode 265 as a negative boost converter under control of a controller such as controller 125, using pulse width modulation to provide a negative DC voltage across output capacitor 275. In this example, transistor 250 operates as a negative boost transistor.

In one embodiment, input circuit 110 may also include transistor 280 that forms part of a buck-boost converter in a battery mode of operation. For example, in a battery mode of operation, controller 125 may direct relays 225 and 230 to switch from the positions illustrated in FIG. 2 to positions coupling battery 120 with inductors 235 and 240. Continuing with this example, the positive boost circuit that includes inductor 235, transistor 245, and output diode 260 may generate positive DC voltage across output capacitor 270 as discussed above with respect to the line mode of operation. In one embodiment, to generate negative voltage across output capacitor 275 in a battery mode of operation, transistors 245 and 250 operate as a buck-boost circuit with transistor 280 being cycled on and off. For example, during each cycle, transistor 250 may turn on a period of time (for example 0.5 microseconds) prior to transistor 280, and transistor 280 may remain on for a period of time, for example 0.5 microseconds, after transistor 250 turns off, thus lowering transistor 280 switching losses.

As illustrated in FIG. 2, transistor 280 is coupled between diode 255 and boost transistor 250. In this illustrated embodiment, transistor 280 may include an insulated gate bipolar transistor (IGBT) or a low power MOSFET device configured as battery voltage and negative output voltage across output capacitor 275, as in this example the voltage across transistor 280 during normal operation of input circuit 110 in a battery mode of operation does not exceed a value substantially equal to the battery voltage. It should be appreciated that other configurations are possible. For example, transistor 280 may be coupled between inductor 240 and output diode 265.

In various embodiments, the configuration of input circuit 110 differs from the embodiment of FIG. 2. For example, as illustrated in FIG. 2, input circuit 110 includes input diodes 205 and 210 and input capacitors 215 and 220. In one embodiment, input capacitors 215 and 220 need not be used. In some embodiments, such as for an input DC voltage, input diodes 205 and 210 need not be used. Further, in various embodiments relays 225 and 230 may include transistors and diodes, and UPS 100 may derive power from both line and battery sources at substantially the same time. In some embodiments, power sources may be single phase, or multiphase sources of various voltages.

In some embodiments, and as described below, a controller such as controller 125 controls the operation of input circuit 110 to provide power factor correction at the input of UPS 100 so that UPS 100 input current and input voltage are substantially in phase. Controller 125 may also control the mode of operation of input circuit 110, for example by selectively switching between continuous and discontinuous modes of operation, to control the operating frequency of input circuit 110.

Figure 3:
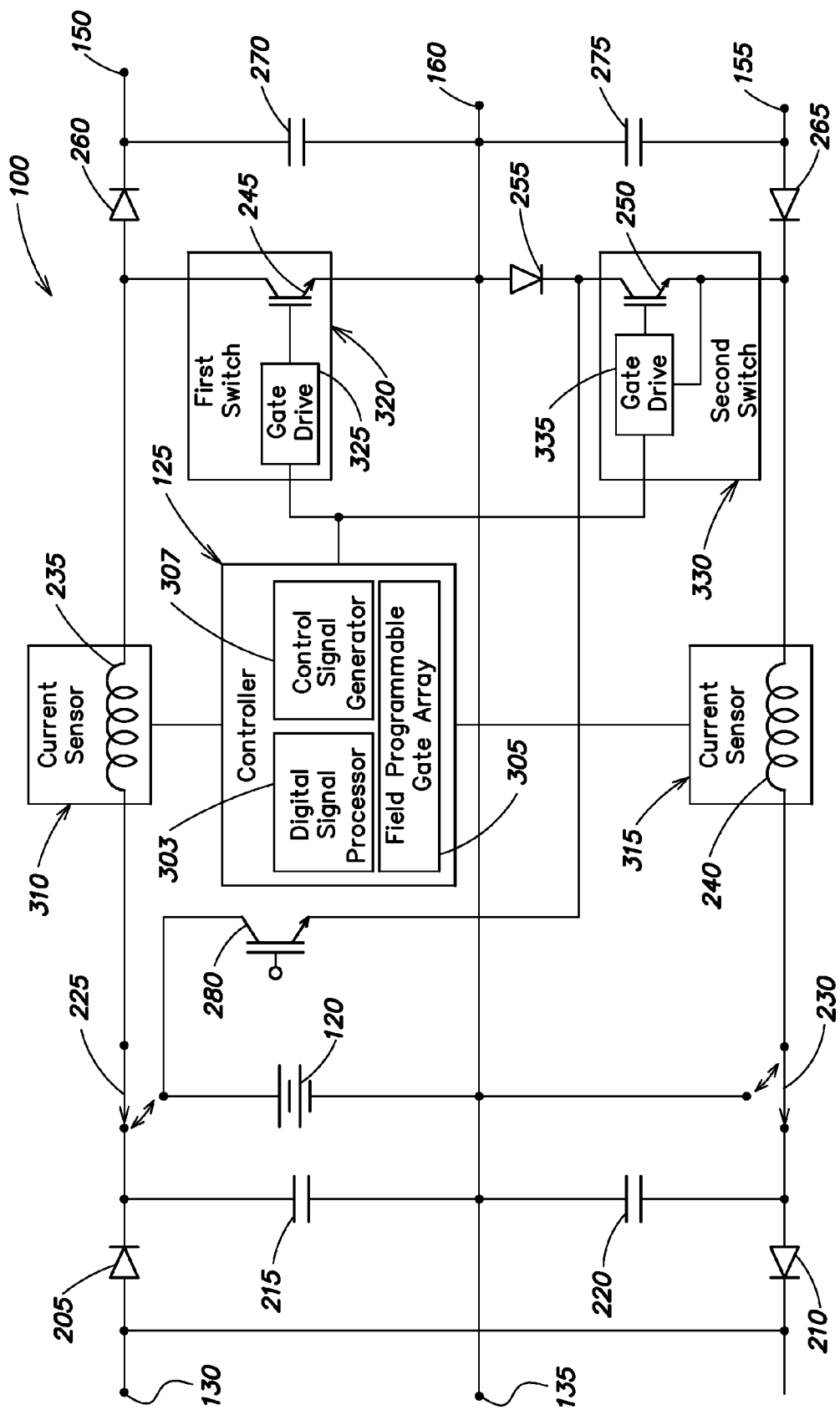
FIG. 3 is a functional block diagram depicting an uninterruptable power supply in accordance with an embodiment of the invention.

FIG. 3 is a functional block diagram depicting uninterruptable power supply (UPS) 100 in accordance with the invention. In one embodiment, UPS 100 includes at least one controller 125. For example, controller 125 may include at least one processor or other logic device. In some embodiments, controller 125 includes a digital signal processor (DSP) 303 and field programmable gate array (FPGA) 305. Controller 125 may also include at least one application specific integrated circuit (ASIC), or other hardware, software, firmware, or combinations thereof. In various embodiments, one or more controllers 125 may be part of UPS 100, or external to but operatively coupled with UPS 100.

In one embodiment, controller 125 includes at least one control signal generator 307. Control signal generator 307 may be part of controller 125 or a separate device that outputs a control signal responsive, at least in part, to instructions from controller 125. In one embodiment, control signal generator 307 includes DSP 303 and FPGA 205. Control signal generator 307 may generate, form, or otherwise output a control signal such as a pulse width modulation (PWM) control signal. In one embodiment, control signal generator 307, for example in combination with controller 125, can adjust the duty cycle of a PWM control signal to switch input circuit 110 modes of operation between any of a continuous, discontinuous, and just-discontinuous modes of operation.

As illustrated in FIG. 3, current sensor 310 may sample or otherwise determine inductor current at inductor 235, and current sensor 315 may sample or otherwise determine inductor current at inductor 240. In one embodiment, inductor current values identified by current sensors 310 and 315 are provided to controller 125. Based at least in part on one or more sensed inductor current values, controller 125 can switch the operating mode of one or both of transistors 245 and 250. In one embodiment, responsive to current sensor 310 indicating that the current through inductor 235 is zero, gate drive 325 may turn on first switch 320, which includes transistor 245. For example, transistor 245 may switch on when inductor current at inductor 235 is determined to be zero, and when transistor 245 has been off for a period of time that is greater than a predetermined period of time, which has the effect of clipping the maximum operating frequency input circuit 110.

Analogously, in one embodiment, responsive to current sensor 315 indicating that the current through inductor 240 is zero, gate drive 335 may turn on second switch 330, which includes transistor 250. For example, transistor 250 may turn on when inductor current at inductor 240 is determined to be zero, and when transistor 250 has been off for a period of time that is greater than a predetermined period of time, which also clips the maximum operating frequency of input circuit 110. In various embodiments, gate drives 325 and 335 can switch respective transistors 245 and 250 on and off independently of each other.

Figure 3A:
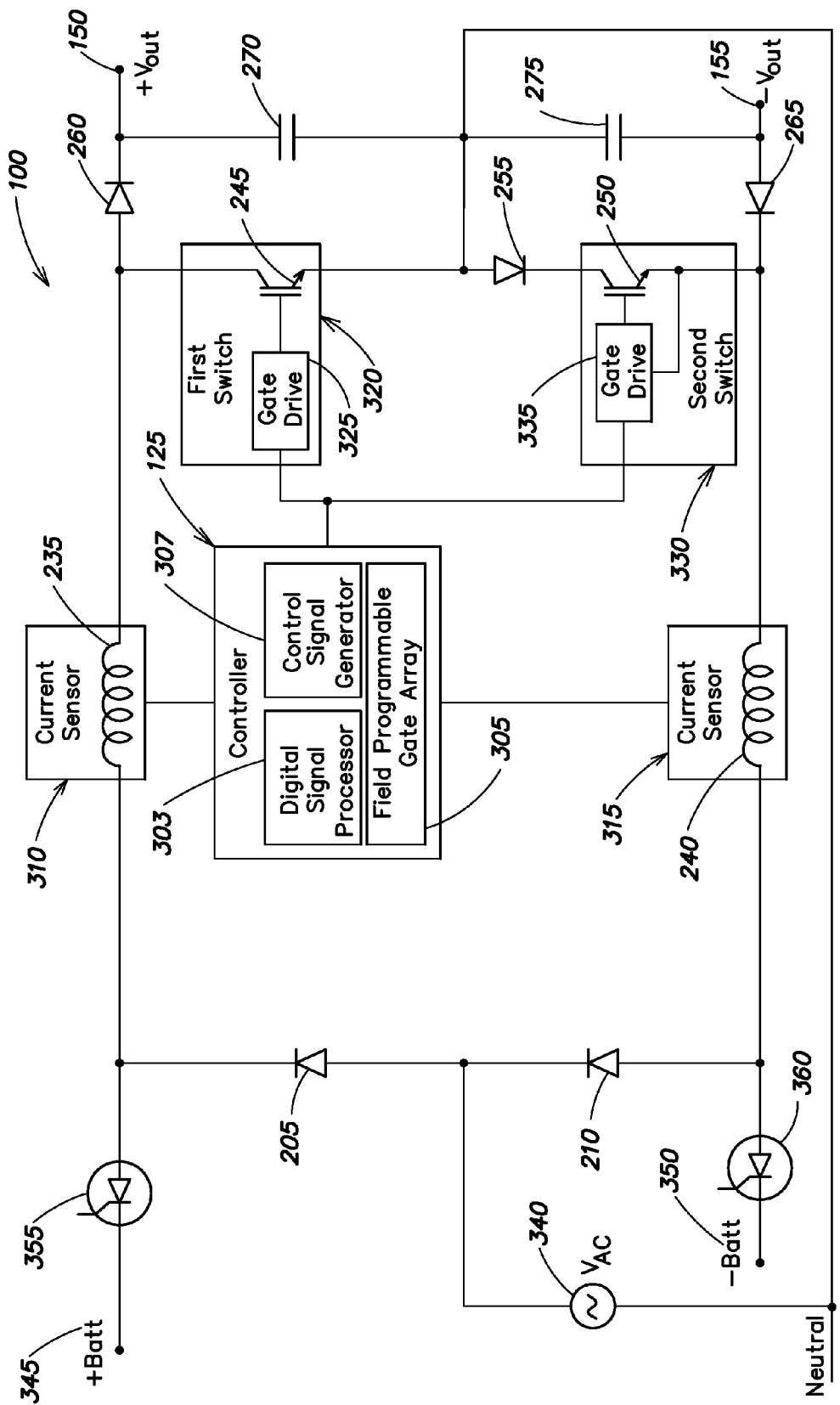
FIG. 3A is a functional block diagram depicting an uninterruptable power supply in accordance with an embodiment of the invention.

FIG. 3A is a functional block diagram depicting uninterruptable power supply (UPS) 100 in accordance with the invention. FIG. 3A illustrates a single phase rectifier embodiment with AC input voltage 340 configured for a battery backup mode of operation with dual battery bus lines for positive battery terminal 345 and negative battery terminal 350. As illustrated in FIG. 3A, a switch such as semiconductor controlled rectifier 355 can electrically connect positive battery terminal 345 with inductor 235, and a switch such as semiconductor controlled rectifier 360 can electrically connect negative battery terminal 350 with inductor 240. As illustrated in FIG. 3A, control signal generator 307 of controller 125 can generate a pulse width modulation control signal to control the switching of first switch 320 and second switch 330 as described with respect to FIG. 3.

Figure 4:
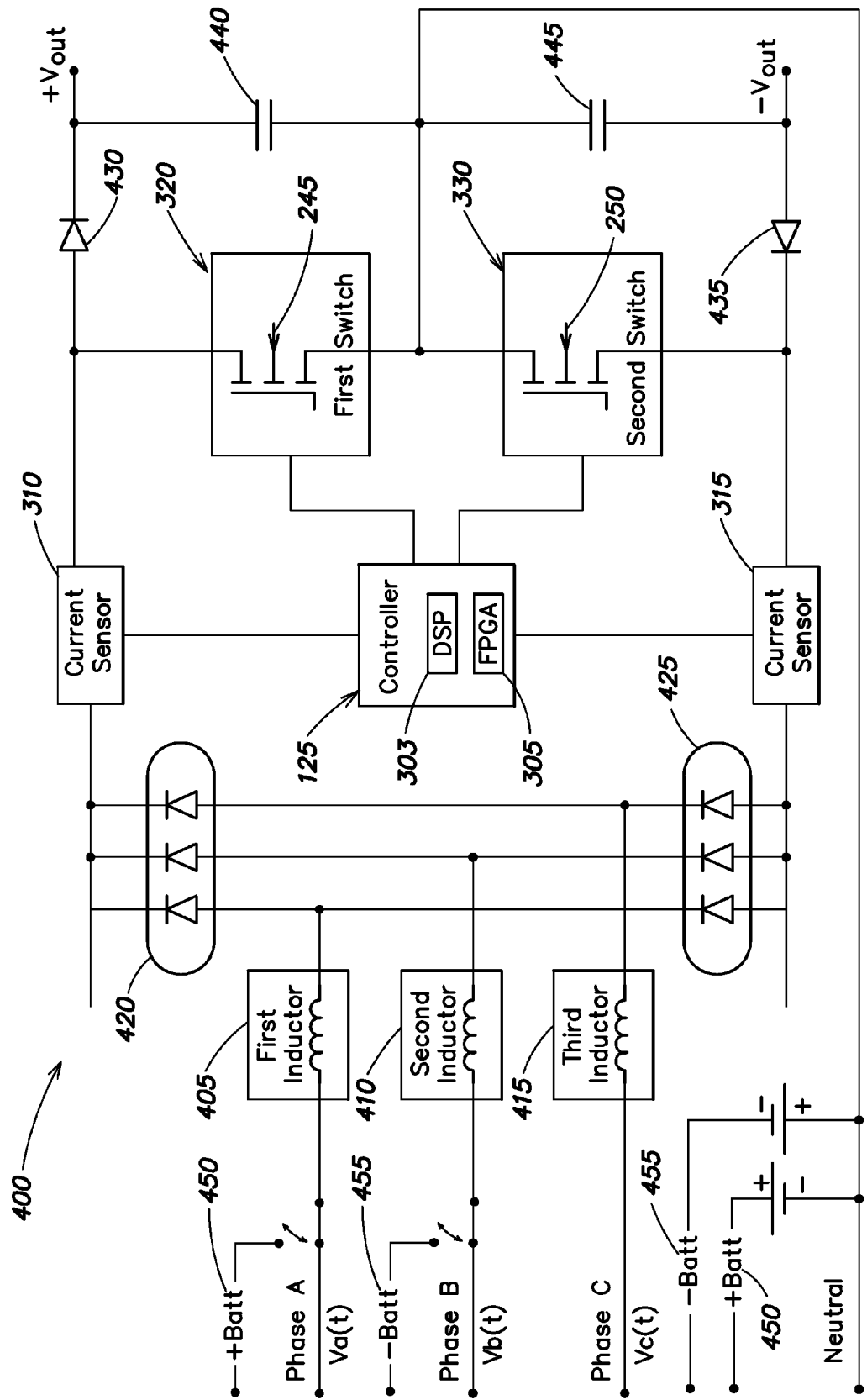
FIG. 4 is a schematic diagram depicting an uninterruptable power supply that includes a three phase rectifier in accordance with an embodiment of the invention.

FIG. 4 is a schematic diagram depicting a three phase rectifier 400 in accordance with an embodiment of the invention. In one embodiment, three phase rectifier 400 is used with, or forms part of, an uninterruptable power supply such as UPS 100. In one embodiment, three phase rectifier 400 is an input circuit that includes voltage input lines Phase A, Phase B, and Phase C, respectively coupled with first inductor 405, second inductor 410, and third inductor 415. Each phase line may include at lease one rectifying diode 420 for positive voltage boost converter operation, and at least one rectifying diode 425 for negative voltage boost converter operation. Three phase rectifier 400 may also include output diodes 430 and 435, and output capacitors 440 and 445. With respect to FIG. 4, it should be appreciated that first switch 320, output diode 430 and any of first inductor 405, second inductor 410, and third inductor 415 can form part of a positive boost converter and that second switch 330, output diode 435, and any of first inductor 405, second inductor 410, and third inductor 415 can form part of a negative buck converter.

With reference to FIG. 4, when configured for three phase operation with a grounded neutral, rectifier 400 in one embodiment operates in a just-discontinuous mode of operation. For example, the ON time $T_{ON}$ of first switch 320 and second switch 330 can be a fixed period of time for a given load and input line voltage. In this example, controller 125 via pulse width modulation can control the OFF time of first switch 320 and second switch 330 based, for example, on the total reset current, i.e., inductor current sensed by at least one of current sensor 310 and current sensor 315. In one embodiment, first switch 320 and second switch 330 remain off until the reset current is zero. The OFF time can change during the line cycle, thereby changing the switching frequency with which first switch 320 and second switch 330 turn on and off over the entire line cycle. For example, the ON time $T_{ON}$ of first switch 320 and second switch 330 can be the same or substantially the same when the frequency of operation is the same or substantially the same at a point in time. Continuing with this example, the inductor currents sensed by current sensor 310 and current sensor 315 can drop to zero at different times. In this example, first switch 320 and second switch 330 can turn off at different times (e.g., when an inductor current reaches zero) when the frequency of operation can be the same or substantially the same at a point in time.

In one embodiment, using the just-discontinuous mode discussed above, rectifier 400 elements, (e.g., those operating as a positive or negative boost converter) may operate at a low frequency when the input line voltage at Phase A, Phase B, and Phase C is above a certain amount, such as 240 VAC. For example, positive or negative boost converters that are part of an input circuit (e.g., rectifier 400) may operate at frequencies of less than 20 kHz during high input voltage or heavy load conditions, thus becoming audible, as in this example peak input line voltage may approach the output voltage of the boost converters. Further, at light load conditions, the operating frequency of the input circuit could increase to a high level that may be inefficient or unsustainable.

In one embodiment, to control rectifier operating frequency, rectifier 400 includes at least one positive boost converter, (e.g., including first switch 320, output diode 430, and at least one of first inductor 405, second inductor 410, and third inductor 415) and at least one negative boost converter, (e.g., including second switch 330, output diode 435, and at least one of first inductor 405, second inductor 410, and third inductor 415) that may operate in the fixed frequency mode from 60 degrees to 120 degrees of the AC waveform, which limits the peak operating current. In this example, controller 125 may direct rectifier 400 to operate in continuous and just-discontinuous modes of operation by controlling first switch 320 and second switch 330, thus controlling the minimum and maximum operating frequency of rectifier 400.

In one embodiment, rectifier 400 operates in a battery mode. For example, rectifier 400 may include a dual battery bus having positive battery terminal 450 and negative battery terminal 455. Continuing with this example, in a battery mode of operation, a switch can electrically connect positive battery terminal 450 with any of first inductor 405 (as illustrated in FIG. 4), second inductor 410, and third inductor 415. A switch can also electrically connect negative battery terminal 455 with any of first inductor 405, second inductor 410 (as illustrated in FIG. 4), and third inductor 415.

With reference to FIGS. 1-4, in one embodiment uninterruptable power supply 100 includes rectifier 400, transistor 245, transistor 250, first inductor 405, second inductor 410, and third inductor 415. During operation, rectifier 400 may be operatively coupled to controller 125, which can include DSP 303 and FPGA 305. Continuing with this embodiment, at least one of current sensors 310 and 315 can detect inductor current from at least one of inductors 405, 410, and 415, and can indicate the value of the detected inductor current to, for example DSP 303. In this example, DSP 303 can generate a current error value based in part on the detected inductor current value. The current error value may be provided to FPGA 305. FPGA 205 may generate a pulse width modulation control signal based in part on the current error value, and controller 125 can apply the pulse width modulation control signal to at least one of transistor 245 and 250 to reversibly and selectively switch their states of operation between on and off states. In doing so, controller 125 can control the on and off time of transistors 245 and 250, and their operating state. For example, controller 125 can apply the pulse width modulation control signal to operate at least one of transistors 245 and 250 in two modes of operation, e.g., continuous and just-discontinuous, during a line cycle.

Figure 4A:
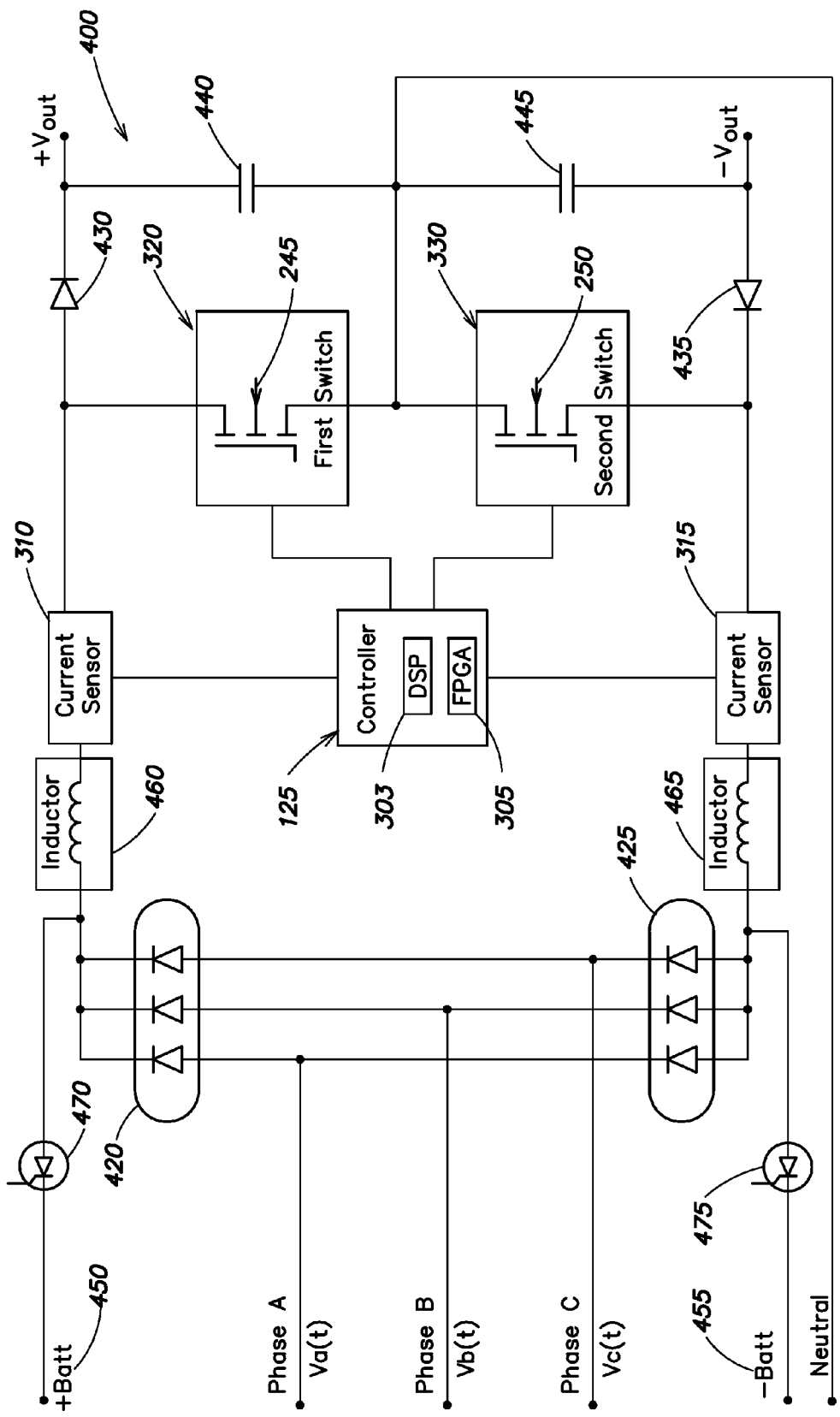
FIG. 4A is a schematic diagram depicting an uninterruptable power supply that includes a three phase rectifier in accordance with an embodiment of the invention.

FIG. 4A is a schematic diagram depicting a three phase diode OR rectifier 400 configuration in accordance with an embodiment. As illustrated in FIG. 4A, the three phases A, B, and C are connected into a diode OR configuration with the boost converter of inductor 460, (e.g., inductor 460 and first switch 320), and with the boost converter of inductor 465 (e.g., inductor 465 and second switch 330). As illustrated in FIG. 4A, controller 125 controls first switch 320 and second switch 330 operation to shape the output current from 60 degrees to 120 degrees of the AC waveform, when phases A, B, and C are independent. In one embodiment, the circuit configuration for rectifier 400 illustrated in FIG. 4A operates with averaged total harmonic distortion levels of about 30% or less. With respect to FIG. 4A, during battery mode operation, a switch such as semiconductor controlled rectifier 470 can electrically connect positive battery terminal 450 with inductor 460, and a switch such as semiconductor controlled rectifier 475 can electrically connect negative battery terminal 455 with inductor 465.

Figure 4B:
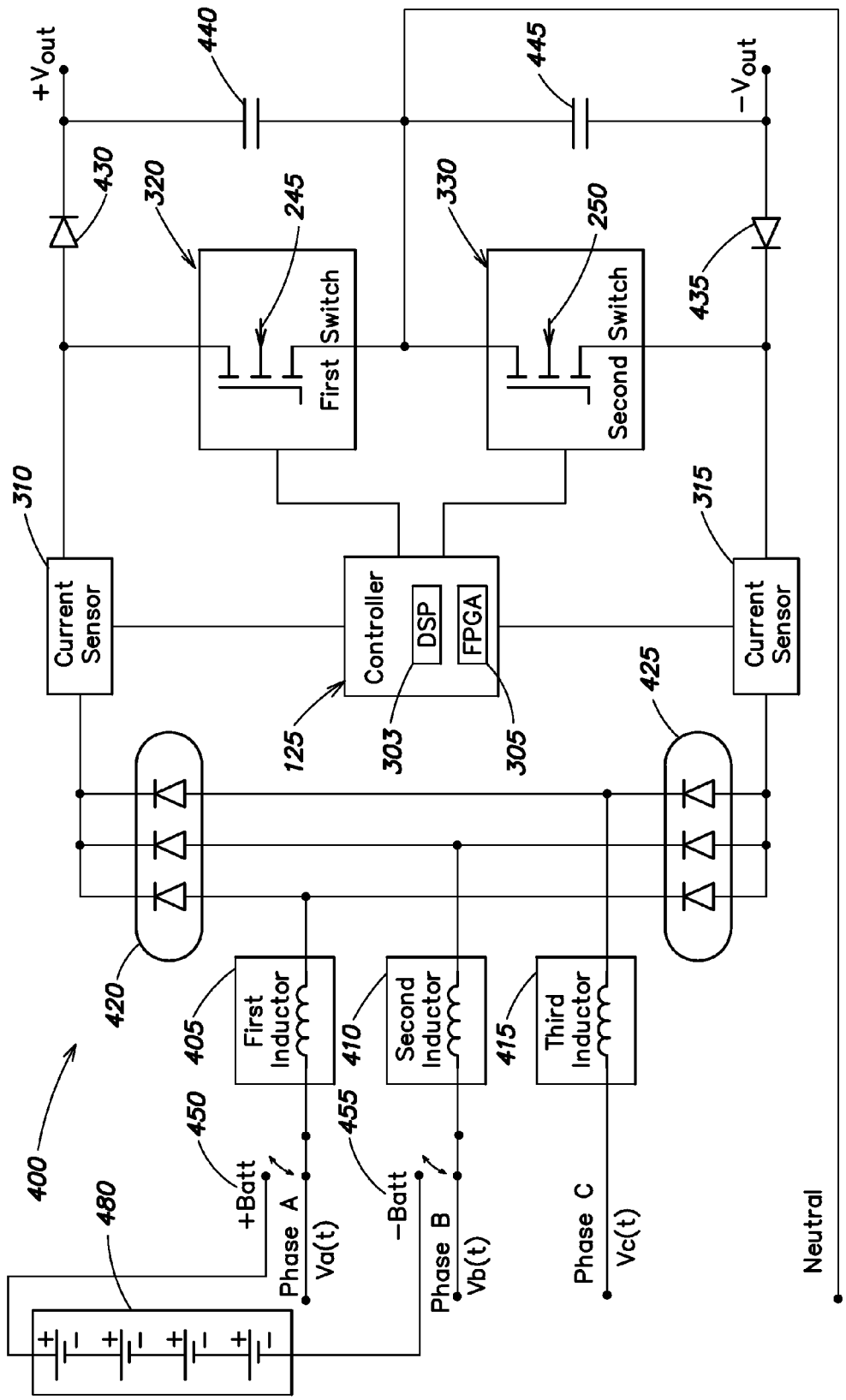
FIG. 4B is a schematic diagram depicting an uninterruptable power supply that includes a three phase rectifier in accordance with an embodiment of the invention.

FIG. 4B is a schematic diagram depicting a three phase partially decoupled rectifier 400 with a single battery mode configuration in accordance with an embodiment. With respect to FIG. 4B, in a battery mode of operation, a switch such as a semiconductor controlled rectifier, silicon controlled rectifier, or other switch can electronically connect positive battery terminal 450 with first inductor 405 as illustrated, or with second inductor 410 or third inductor 415 in other configurations. A switch can also electrically connect negative battery terminal 455 with second inductor 410 as illustrated, or with first inductor 405 or third inductor 415 in other configurations. In a battery mode of operation, battery pack 480, which includes one or more batteries, can supply power to rectifier 400.

With continued reference to FIGS. 1 and 4B, in one embodiment where rectifier 400 operates in a battery mode, the switching pattern of first switch 320 and second switch 330 is synchronized with the load, (for example load 105 of FIG. 1, i.e., an inverter load). For example, when inverter 105 produces the positive half of a sine wave, the switch operating as the negative boost switch (for example second switch 330) can be maintained in an on position with the switch operating as the positive boost switch (for example first switch 320) being pulse width modulated by controller 125. During the negative half of inverter 105 sine wave output, the switch operating as the positive boost switch (for example first switch 320) can be maintained in an on position with the switch operating as the negative boost switch (for example second switch 330) being pulse width modulated by controller 125. In one embodiment, the rectifier 400 configuration of FIG. 4B operates with a single battery pack 480. In another embodiment, this rectifier configuration operates with multiple power modules that share battery packs.

Figure 4C:
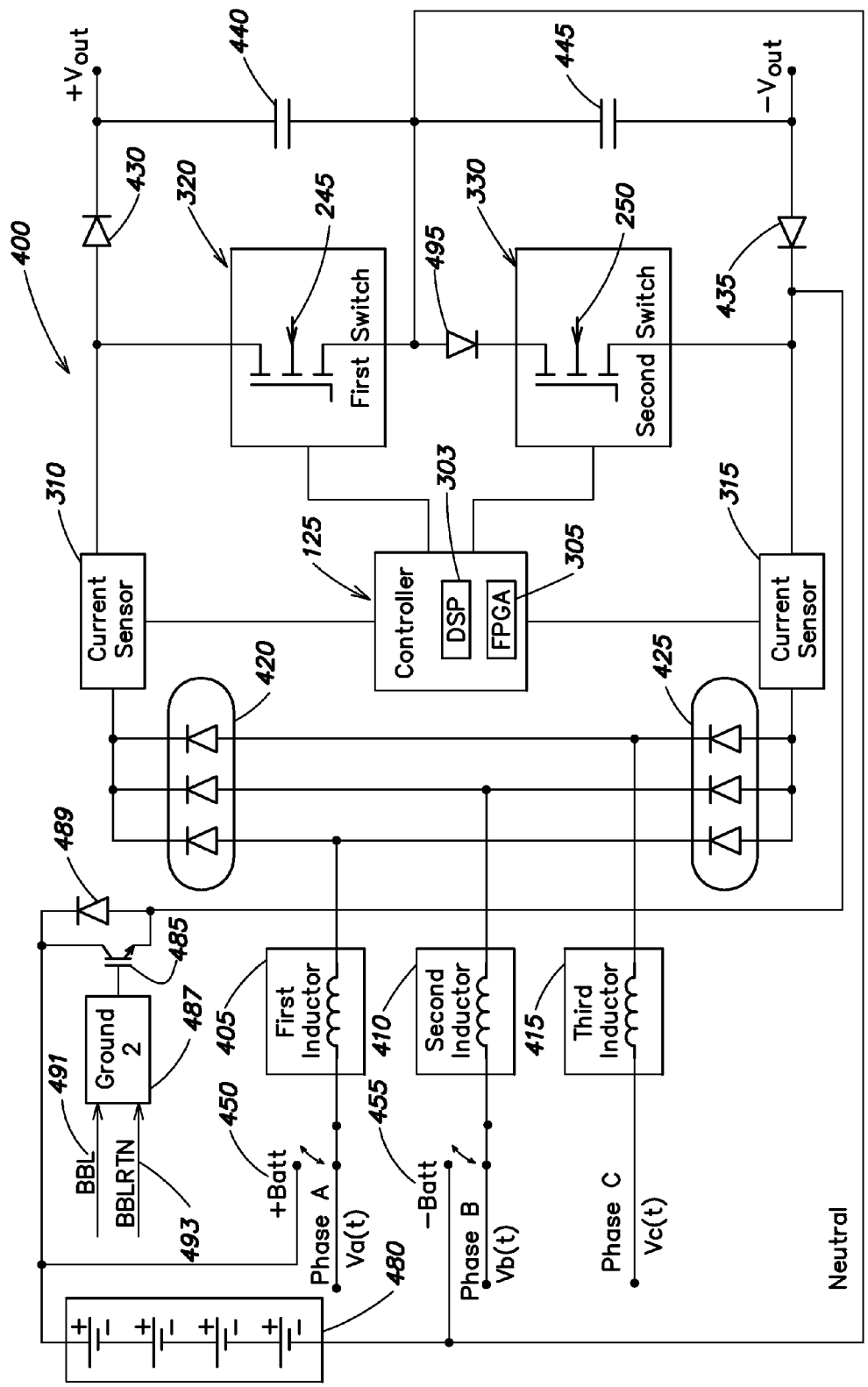
FIG. 4C is a schematic diagram depicting an uninterruptable power supply that includes a three phase rectifier in accordance with an embodiment of the invention.

FIG. 4C is a schematic diagram depicting a three phase partially decoupled rectifier 400 that operates from a single battery bus in a battery mode configuration using buck boost switch 485 in accordance with an embodiment. As illustrated in FIG. 4C, buck boost switch 485 connects the battery voltage from battery pack 480 to diode 435. In one embodiment, buck boost switch 485 includes a switch with a voltage rating of at least 900 volts. As illustrated in FIG. 4C, diode 435 operates as a negative boost diode, and in one embodiment having the configuration illustrated in FIG. 4C, diode 435 has a voltage rating of at least 900 volts. The configuration of rectifier 400 as illustrated in FIG. 4C, in one embodiment, has an operating frequency of 30 kHz or less. In various embodiments, buck boost switch 485 and diode 435 can have other voltage ratings as well, both greater than and less than 900 volts, such as 800 volts or 1000 volts, and the operating frequency of rectifier 400 can be more than 30 kHz in some embodiments.

In a battery mode of operation, battery pack 480 is coupled with buck boost switch 485, which itself is coupled to ground 487, which also receives battery bus line (BBL) 491 and battery bus line return to neutral (BBLRTN) 493, and to diode 489. In one embodiment, rectifier 400 having the configuration illustrated in FIG. 4C includes diode 495 coupling first switch 320 and second switch 330.

Figure 4D:
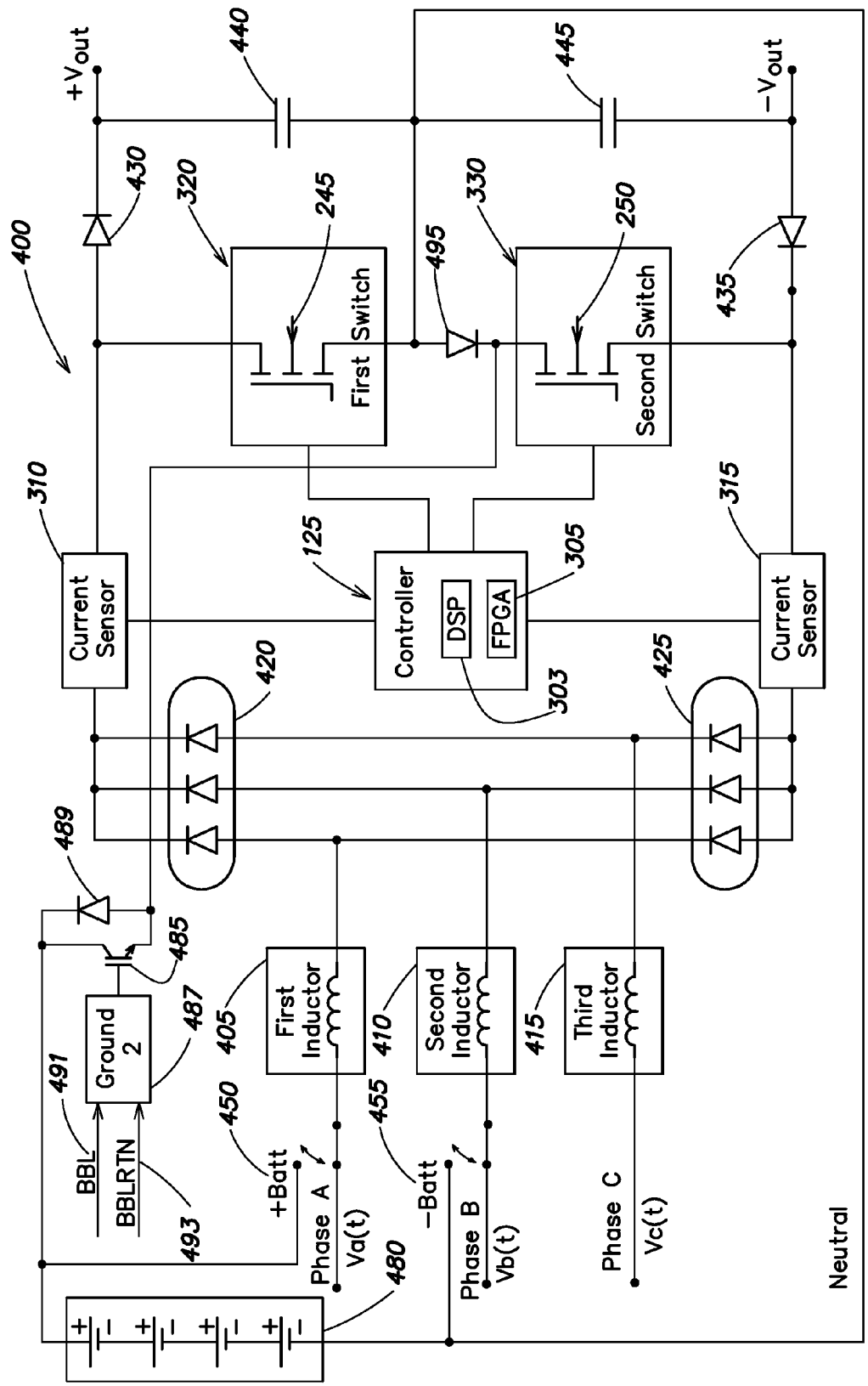
FIG. 4D is a schematic diagram depicting an uninterruptable power supply that includes a three phase rectifier in accordance with an embodiment of the invention.

FIG. 4D is a schematic diagram depicting a three phase partially decoupled rectifier 400 that operates from a single battery bus in a battery mode configuration using buck boost switch 485 in accordance with an embodiment. As illustrated in FIG. 4D, buck boost switch 485 connects the battery voltage from battery pack 480 to second switch 330, (e.g. operating as a negative boost switch). With reference to FIG. 4D, in one embodiment, buck boost switch 485 includes a power field effect transistor (FET) having a low on resistance to reduce conduction or switching losses in buck boost switch 485. As illustrated in FIG. 4D, second switch 330 operates as a negative boost switch, and diode 435 operates as a negative boost diode with a voltage rating of, in one embodiment, at least 1200 volts. In one embodiment, rectifier 400 having the configuration illustrated in FIG. 4D has a switching frequency of 80 kHz or less. In various embodiments the voltage rating of diode 435 and the maximum switching frequency can vary. For example, diode 435 can have a voltage rating of less than 1200 volts (e.g., 1100 volts) and rectifier 400 as illustrated in FIG. 4D can have a switching frequency greater than 80 kHz, (e.g., 90 kHz).

In a battery mode of operation, battery pack 480 is coupled with buck boost switch 485, which itself is coupled to ground 487, which also receives battery bus line (BBL) 491 and battery bus line return to neutral (BBLRTN) 493, and to diode 489. In one embodiment, rectifier 400 having the configuration illustrated in FIG. 4D includes diode 495 coupling first switch 320 and second switch 330. As illustrated in FIGS. 4A-4D, controller 125 can generate a pulse width modulation control signal to control the switching of first switch 320 and second switch 330 as described with respect to FIG. 4.

Figure 5:
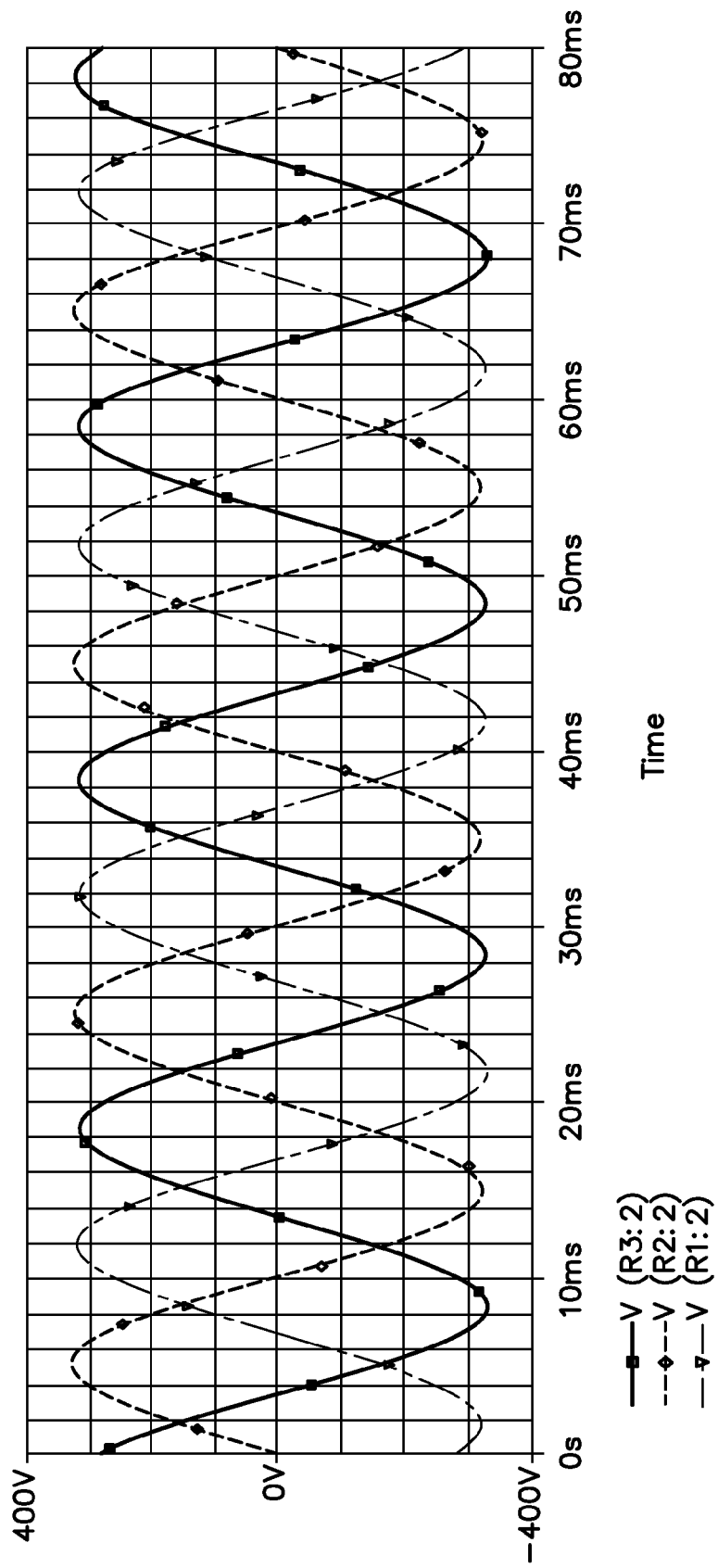
FIG. 5 is a graph depicting a three phase line cycle in accordance with an embodiment of the invention.

In some embodiments, and with reference to FIGS. 4-4D and 5, at any point in time there can be either two positive phases and one negative phase, or two negative phases and one positive phase. For example, FIG. 5 depicts a ±400 v three phase line cycle in accordance with an embodiment of the invention. As illustrated in FIG. 5, Phase A and Phase B may be positive with respect to neutral and Phase C may be negative with respect to neutral. In this example, current ramps up in first inductor 405 and second inductor 410 when first switch 320 is on, and the peak current in first inductor 405 and second inductor 410 depends on the phase voltage across the respective inductor. Continuing with this example, when first switch 320 turns off, the voltage across first inductor 405 and second inductor 410 can be different, but current from each of these inductors flows through the respective rectifying diode 420 and output diode 430 to the load, (not illustrated in FIG. 4) and output capacitor 440. In this example, current sensor 310 measures the total current from first inductor 405 and second inductor 410 when first switch 320 is turned off. Controller 125 can maintain first switch 320 in an off configuration until the total current from first inductor 405 and second inductor 410, measured by current sensor 310, reaches zero or is determined to be substantially zero. In other words, in this example of just-continuous operation, controller 125 turns first switch 320 on when the inductor current associated with that switch reaches zero. In addition to the total current reaching zero, first switch 320 can be off for a minimum period of time before controller 125 instructs first switch 320 to revert to an open configuration.

Rectifier 400 can operate with two negative phases and one positive, with respect to neutral. For example, at various points in the line cycle, Phase A may be positive, and Phase B and Phase C may be negative with respect to neutral. In this example, total inductor current may ramp up in second inductor 410 and third inductor 415 when second switch 330 is on. When second switch 330 turns off, current sensor 315 measures the total inductor current from second inductor 410 and third inductor 415. When this total inductor current reaches zero, controller 125 turns on second switch 330. In addition to current sensor 315 detecting zero current, second switch 330 can remain off for a minimum time period prior to turning on again. It should be appreciated that these examples are illustrative, and that peak current measured by first current sensor 310 and second current sensor 315 can vary depending on how many phases are adding current to rectifier 400.

Figure 6:
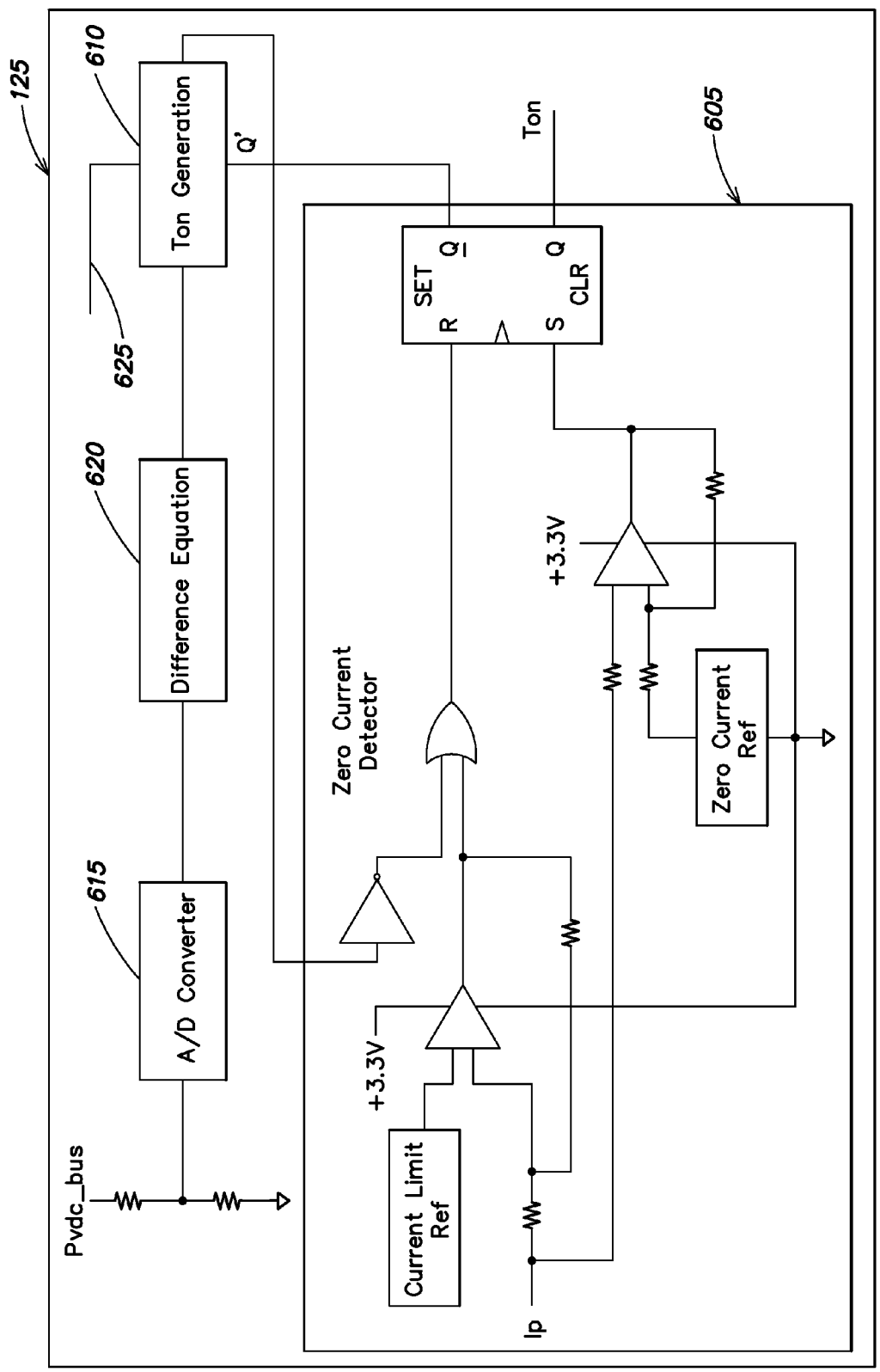
FIG. 6 is a schematic diagram depicting a controller in accordance with an embodiment of the invention.

FIG. 6 is a schematic diagram depicting an embodiment of controller 125. In one embodiment, controller 125 includes at least one zero current detector 605. For example, at least one of current sensors 310 and 315 may indicate the value of the sensed inductor current in rectifier 400. Zero current detector 605 may apply the $T_{ON}$ signal (e.g a pulse width modulation signal) to for example at least one of first switch 320 and second switch 330 to change the operating state of at least one of transistors 245 and 250. In one embodiment, zero current detector 605 operates with $T_{ON}$ signal generator 610 to generate the $T_{ON}$ signal. For example, analog to digital converter 615 may provide a signal to difference equation 620, whose output can indicate that at least one of transistors 245 and 250 is to turn on, thus ramping up inductor current. In some embodiments, $T_{ON}$ signal generator 610 can indicate that the ON time of one of transistors 245, 250 causing inductor current to decrease. In one embodiment, $T_{ON}$ signal generator 610 may also include enablement signal 625.

Figure 7:
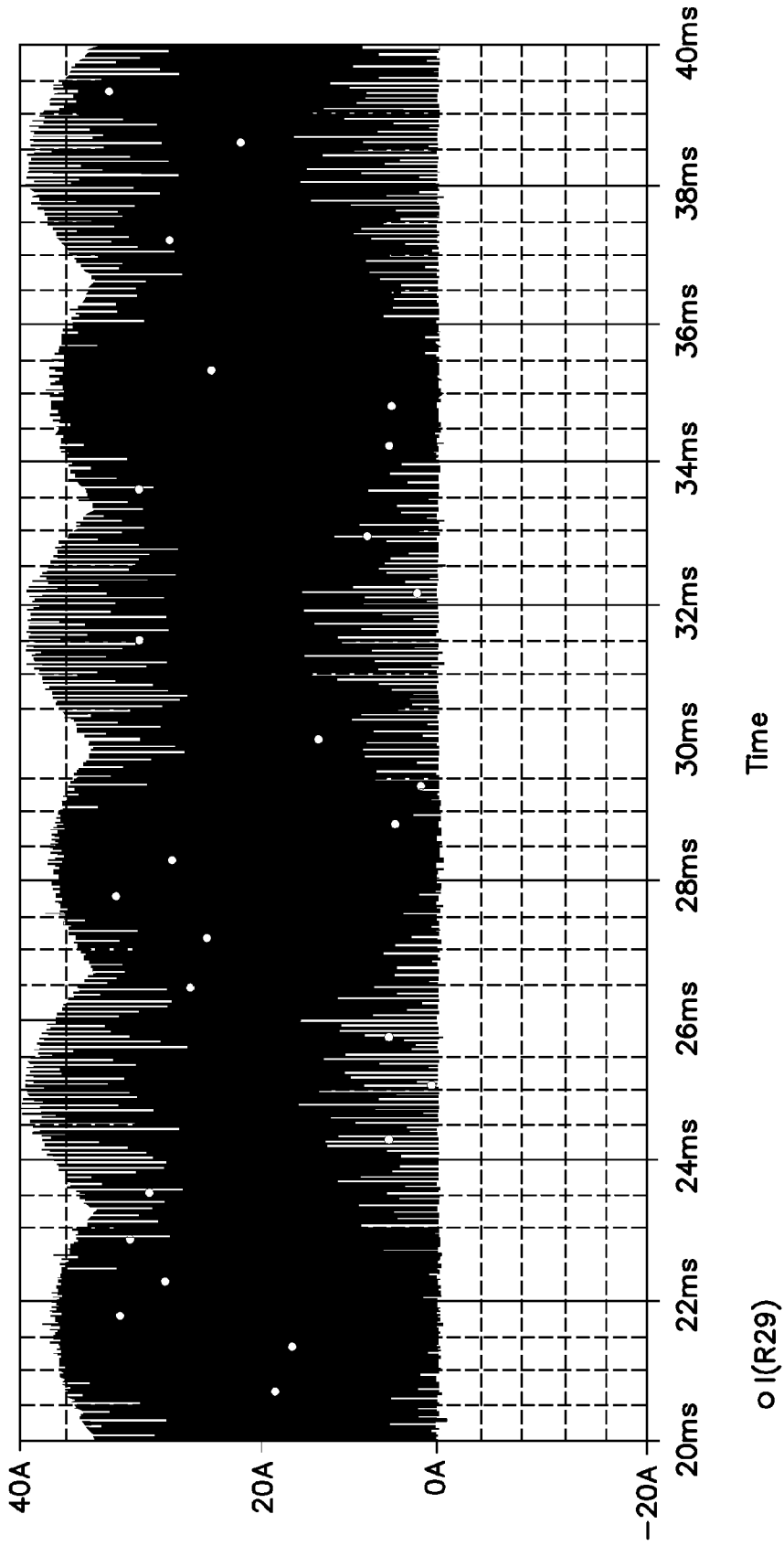
FIG. 7 is a graph depicting inductor current in an input circuit operating in just-discontinuous mode during a line cycle in accordance with an embodiment of the invention.
Figure 8:
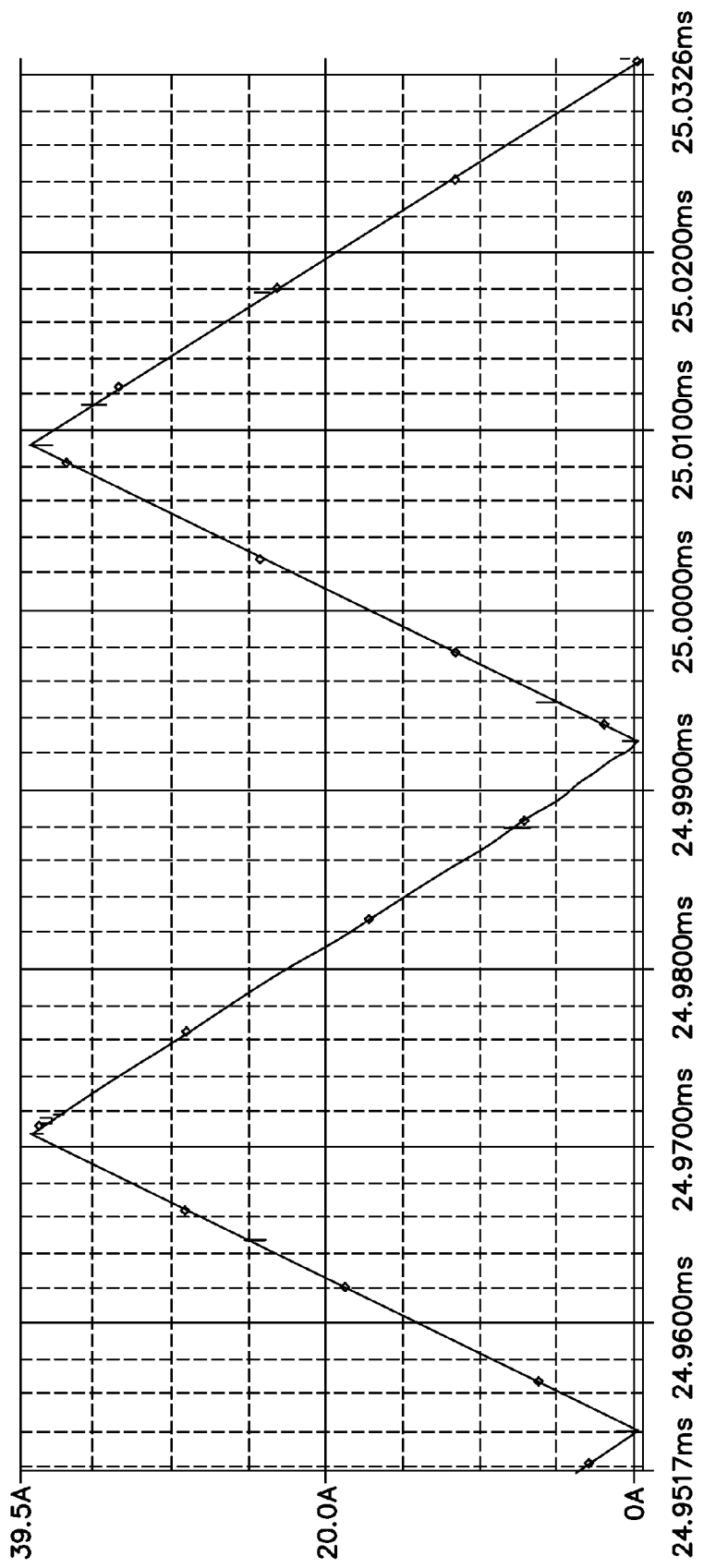
FIG. 8 is a graph depicting inductor current in an input circuit operating in just-discontinuous mode during a line cycle in accordance with an embodiment of the invention.

Thus, in various embodiments, controller 125 switches the operating state of transistors 245 and 250 when the total current is determined to be zero. An example of just-discontinuous operation of rectifier 400 is illustrated in FIG. 7, which depicts inductor current in rectifier 400 operating in just-discontinuous mode during a line cycle. As illustrated in FIG. 7, the peak current varies depending on how many phases are contributing current to the output, and the current varies between substantially zero and 40 A. FIG. 8 depicts the example of FIG. 7, zoomed into a time of approximately 25 ms, where it can be seen that in one embodiment of a just-discontinuous mode of operation, inductor current of rectifier 400 can drop to zero before ramping up again, without remaining at zero for any substantial period of time. The results of FIGS. 7 and 8 are illustrative. In one embodiment, rectifier 400 can produce the current illustrated in FIGS. 7 and 8 when Phase A, Phase B, and Phase C operate at 160 VAC and rectifier 400 has an output power of 5890 W with first inductor 405, second inductor 410, and third inductor 415 each having an inductance of 100 µH that does not swing with the load current.

With respect to FIGS. 1, 3, and 4, controller 125 can control input circuit 110 or rectifier 400 to provide power factor correction in the just-discontinuous mode using analog and digital circuitry, including digital signal processors 303 and field programmable gate arrays 305. For example, an analog portion of controller 125 may detect a zero current state associated with at least one inductor. In one embodiment, this indicates that a new switching cycle may begin, and controller 125 may proceed to send a signal to turn on a switch, (e.g., first switch 320 or second switch 330) for an amount of time $T_{ON}$, which may be determined by the output of a difference equation. In one embodiment, controller 125 also includes an enablement signal that, for example, must be in a particular state (e.g., a logic one, or high state) to enable controller 125 to operate the switches of input rectifier 400.

In one embodiment, the time $T_{ON}$ for input circuit switches (e.g., transistors 245 or 250) can be different for different line cycles to regulate output voltage. For example, a difference equation may set the $T_{ON}$ time for a line cycle of rectifier 400 and controller 125 may include a timer to determine if the $T_{ON}$ time of rectifier 400, (or converter portions thereof) occurs for at least a minimum period of time for example before a switch can be turned off. For example, to maintain a time period during which the inductor current is greater than zero for 12.5 µs, (corresponding to a switching frequency of approximately 80 kHz) the $T_{ON}$ time may be 6.25 µs in an example having linear inductor current rise during transistor on time and linear inductor current fall during transistor off time.

Controller 125 may also limit the maximum operating frequency of input circuits such as rectifier 400. In one embodiment, at light loads, if otherwise uncontrolled the switching frequency of the input circuit may increase to a level that exceeds the ability of switches to regulate circuit operation. In this example, controller 125 can limit the maximum switching frequency of rectifier 400. While the maximum operating frequency of rectifier 400 can vary, in one embodiment controller 125 limits the maximum switching frequency of rectifier 400 to 130 kHz, and in another embodiment controller 125 limits the maximum switching frequency of rectifier 400 to 80 kHz.

Figure 9:
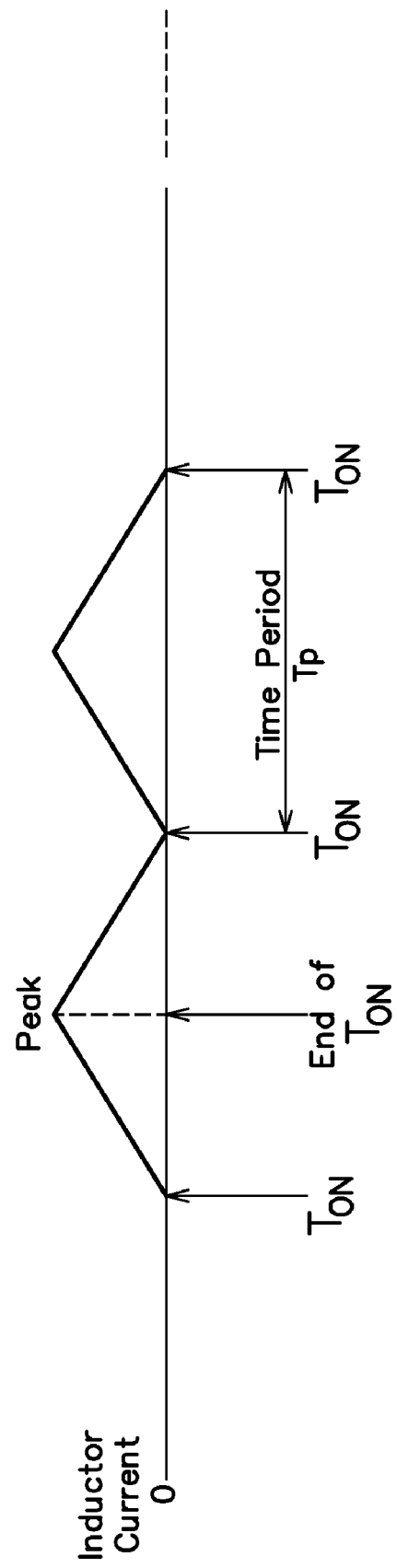
FIG. 9 is a graph depicting an input circuit operating in a just-discontinuous mode of operation in accordance with an embodiment of the invention.

FIG. 9 depicts a graph illustrating rectifier 400 operating in a just-discontinuous mode of operation. As illustrated in FIG. 9, time period $T_{ON}$ begins when inductor current is zero. It should be appreciated that the inductor current may be measured by current sensors 310 or 315 at various points of rectifier 400 other than first inductor 405, second inductor 410, and third inductor 415, and that this current may also be referred to as a switch current, rectifier current, or total inductor current, for example. As illustrated in FIG. 9, inductor current ramps up during $T_{ON}$, and peaks for a given time period $T_P$ at the end of the $T_{ON}$ time, at which point the inductor current begins to ramp down to zero. The time period $T_P$ may vary. In one embodiment, $T_P$ is approximately 12.5 µs. In one embodiment, when a maximum inductor current is reached, the $T_{ON}$ time period may end, allowing inductor current to ramp down toward zero. In this illustrative embodiment of just-discontinuous operation, the $T_{ON}$ period begins when inductor current reaches zero, and in one embodiment the inductor current does not remain at zero for more than a fraction of a millisecond. Although not illustrated in FIG. 9, it is appreciated that in one embodiment, in a continuous mode of operation, inductor current never reaches zero during a time period $T_P$.

Figure 10:
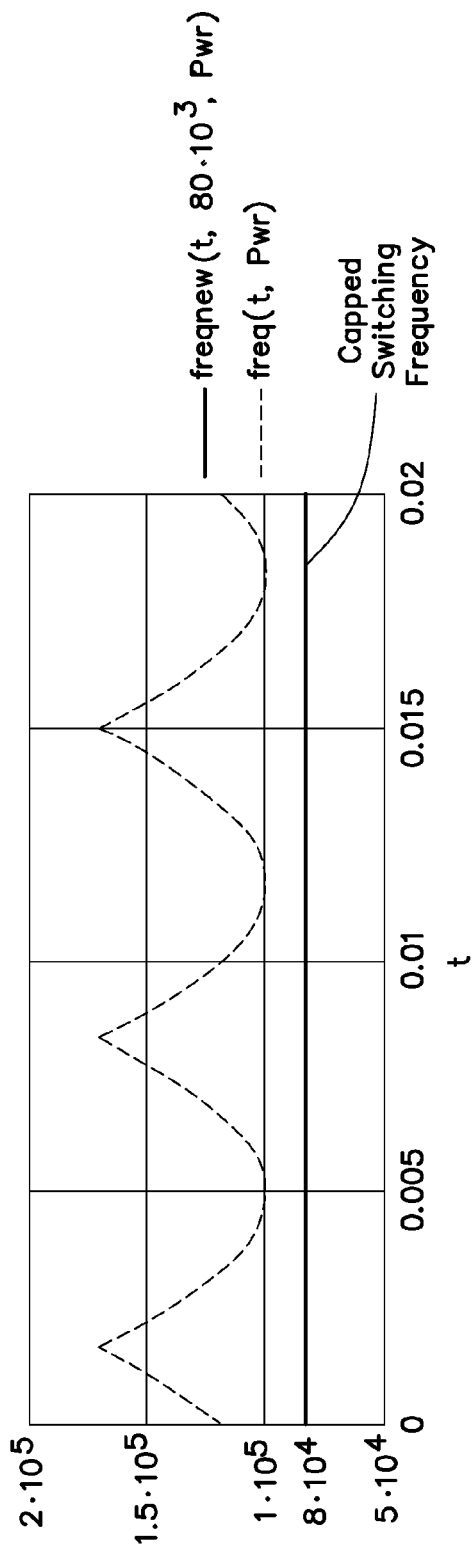
FIG. 10 is a graph depicting input circuit switching frequency during a line cycle in accordance with an embodiment of the invention.

FIG. 10 depicts a graph illustrating an embodiment where rectifier 400 switching frequency is limited to 80 kHz over a complete line cycle. In the example illustrated in FIG. 10, rectifier 400 has 500 W of charging power and provides 1000 W of output power. As indicated by the solid line in FIG. 10, controller 125 can limit the switching frequency of rectifier 400 to 80 kHz during a complete line cycle. In the absence of controller 125, at light loads the switching frequency in one embodiment would appear as indicated by the dashed lines of FIG. 10, varying between approximately 100 kHz and 160 kHz, which may exceed the switching capacity of rectifier 400.

Figure 11:
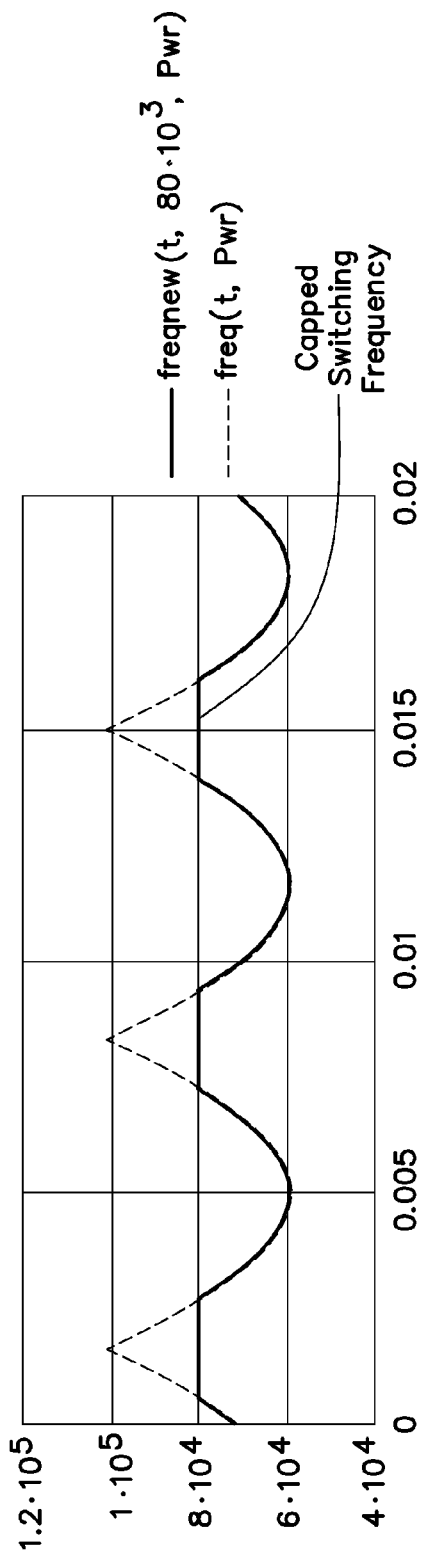
FIG. 11 is a graph depicting input circuit switching frequency during a line cycle in accordance with an embodiment of the invention.

FIG. 11 depicts a graph illustrating an embodiment where rectifier 400 switching frequency is limited to 80 kHz over a portion of a line cycle. In one embodiment, rectifier 400 may operate at the switching frequency as illustrated by the sold line when rectifier 400 has 500 W of charging power and provides 2000 W of output power. In this illustrative embodiment, the dashed lines indicate the switching frequency of rectifier 400 in the absence of controller 125 instructions limit the maximum switching frequency by, for example, controlling the $T_{ON}$ time during which a switch such as first switch 320 is to remain on. By controlling the maximum operating frequency of rectifier 400 so that it does not exceed a threshold value during a line cycle, rectifier 400 operation remains within functional ranges of first switch 320 and second switch 330.

Figure 12:
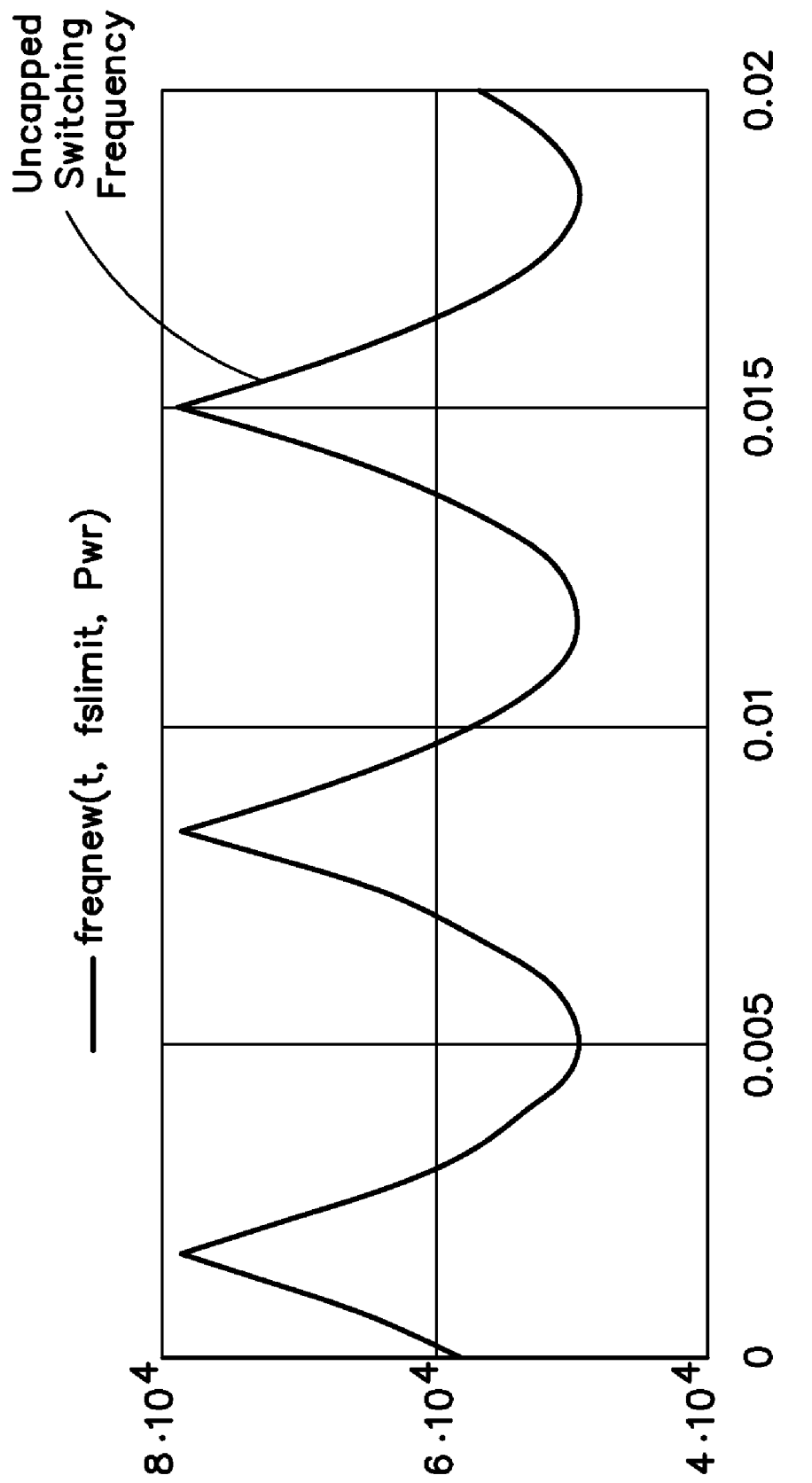
FIG. 12 is a graph depicting input circuit switching frequency during a line cycle in accordance with an embodiment of the invention.

FIG. 12 depicts a graph illustrating an embodiment where rectifier 400 switching frequency is not limited during a line cycle because, for example, the switching frequency of rectifier 400 remains below 80 kHz throughout the line cycle. When rectifier 400 has 500 W of charging power and provides 2000 W of output power, as illustrated in FIG. 12, the switching frequency of rectifier 400 can remain below a threshold value, such as 80 kHz for example, when first inductor 405, second inductor 410, and third inductor 415 include swing inductors that have higher inductance at lower current. The higher inductance values of swing inductors at low currents can hold the maximum frequency of operation to less than a threshold value, such as 80 kHz, as illustrated in FIG. 12, or other frequencies, such as 130 kHz or 160 kHz. In one embodiment, controller 125 includes at least one FPGA 305 and at least one DSP 303 to control the maximum switching frequency of switches 320 and 330 and the switch over point from just-discontinuous to continuous operation. The DSP 303 may generate voltage error gain to reduce circuit complexity and part count, and to achieve a low average total harmonic distortion.

In addition to controlling the maximum operating, or switching, frequency of rectifier 400, in one embodiment controller 125 can control the minimum frequency of rectifier 400 to maintain it above a minimum threshold value. For example, controller 125 can limit the minimum frequency of rectifier 400 to a level above the range of human hearing or about 20 kHz. For example, at high line voltages in the just-discontinuous mode of operation, the operating frequency of rectifier 400 can become low enough to be audible. In one embodiment, controller 125 limits the minimum operating frequency of rectifier 400 (or positive/negative converter components thereof) by transitioning from a just-discontinuous mode of operation to a fixed frequency continuous mode of operation. During the continuous mode of operation, for example, inductor current sampled by current sensor 310 or current sensor 315 does not reach zero. In one embodiment having a three phase rectifier such as rectifier 400, this transition occurs during a part of the line cycle where phase voltages of the three phases are mutually exclusive. For example, this transition occurs between 60 and 120 degrees, and between 240 and 300 degrees of a 360 degree line cycle.

For example, controller 125 may position switches 320 and 330 to operate in a just-discontinuous mode during a 0-60 degree phase angle portion of the line cycle. To limit minimum operating frequency of rectifier 400, in one embodiment, controller 125 may instruct switches 320 and 330 to transition to a fixed frequency continuous mode of operation during phase angles of 60-120 degrees. Continuing with this illustrative embodiment, controller 125 may transition switches 320 and 330 back to the just-discontinuous mode from 120-240 degrees, and from 240-300 degrees may again transition to a continuous mode of operation. Finally, in this example, controller 125 may instruct switches 320 and 330 to operate in the just-discontinuous mode from 300-360 degree phase angles of the line cycle. In one embodiment, input circuits such as rectifier 400 with three phase input voltage main lines operate in conjunction with controller 125 to switch between just-discontinuous and continuous rectifier modes of operation. This limits the highest and lowest frequency of rectifier 400 operation to, for example, between 20 kHz and 80 kHz, preventing high frequency operation that is beyond switching capacity at light loads, and preventing audible frequency operation at heavy loads. In this illustrative embodiment, rectifier 400, or converters thereof, may operate in the just-discontinuous mode from 0-60, 120-240, and 300-360 degrees, and in the continuous mode from 60-120 and 240-300 degrees. Such operation can maintain rectifier 400 operating frequency above a threshold value, such as 20 kHz.

In one embodiment, to make the transition between just-discontinuous and continuous modes of operation seamless, controller 125 includes at least one digital signal processor (DSP) 303 and at least one field programmable gate array (FPGA) 305. In this illustrative embodiment, a current loop in the DSP 303 may operate in parallel with the total inductor current during the variable frequency just-discontinuous mode of operation. This parallel current loop configuration also reduces the average total harmonic distortion by maintaining a seamless inductor current value. In one embodiment, when the phase voltages are independent of each other, for example between 60 and 120 degrees, the DSP 303 of controller 125 may command the FPGA 305 of controller 125 to operate rectifier 400 in a fixed frequency continuous mode of operation. For example, the DSP 303 of controller 125 may include a reference current generator. By evaluating the measured current (for example by at least one of current sensor 310 and current sensor 315), and the reference current generated by the reference current generator, the DSP 303 of controller 125 can generate a current error value, which in this embodiment is the difference between the generated reference current and the actual measured current. The DSP 303 may also include a voltage difference equation to generate a voltage error value. Continuing with this illustrative embodiment, DSP 303 generated information such as the current or voltage error values can be provided to the FPGA 305. In one embodiment the FPGA 305 process at least one of the current and voltage error values in a difference equation, and the output of this computation includes a pulse width modulation control signal modulated to provide power factor correction of rectifier 400. For example, controller 125 may adjust a duty cycle of a pulse width modulation control signal to drive the power factor of rectifier 400 (or any converter therein) toward unity. In one embodiment, FPGA 305 includes at least one multiplexor.

Controller 125 can adjust the duty cycle of the pulse width modulation control signal to selectively transition input circuit transistors such as those of first switch 320 and second switch 330 between variable frequency just-discontinuous and fixed frequency continuous modes of operation to operate rectifier 400 within a frequency range. In one embodiment, this frequency range is between 20 kHz and 80 kHz. In some embodiments, this frequency range is includes a minimum frequency that is above the range of human hearing. In some embodiments, the frequency range is between 20 kHz and 130 kHz.

In one embodiment, controller 125 can adjust at least one duty cycle of at least one pulse width modulation control signal to independently provide power factor correction to both the positive and negative converter circuits of rectifier 400 and regulate output voltage at capacitors 440 and 445. For example, controller 125 can adjust a first pulse width modulation signal duty signal to provide power factor correction to a positive converter of rectifier 400, and can independently adjust a second pulse width modulation signal duty cycle to provide power factor correction to a negative converter of rectifier 400. In one embodiment, positive and negative converters can operate simultaneously in different modes. For example, pulse width modulation of one or more control signals may provide positive power factor correction to a positive converter operating in the just-discontinuous mode, and negative power factor correction to a negative converter operating in the continuous mode. It should be appreciated that the positive converter may also operate in the continuous mode while the negative converter operates in the just-discontinuous mode.

In one embodiment, uninterruptable power supply 100 controlled in accordance with embodiments of the present invention exhibits low total harmonic distortion. In some embodiments, a low-pass LC filter, or other filters with various combinations of resistors, inductors, and capacitors, can filter out average total harmonic distortion including switching frequency voltage harmonics generated by first switch 320 and second switch 330. Further, and as referenced above, DSP 303-based control of rectifier 400 in the just-discontinuous mode of operation where controller 125 includes a DSP 303 with a parallel current loop configuration can also reduce average total harmonic current distortion. The amount of total harmonic distortion in UPS 100 output may vary. In one embodiment, the total harmonic distortion is less than or equal to 3.4% of a UPS output signal. In one embodiment rectifier 400 meets the IEC 61000-3-12 standard for harmonic current.

Figure 13:
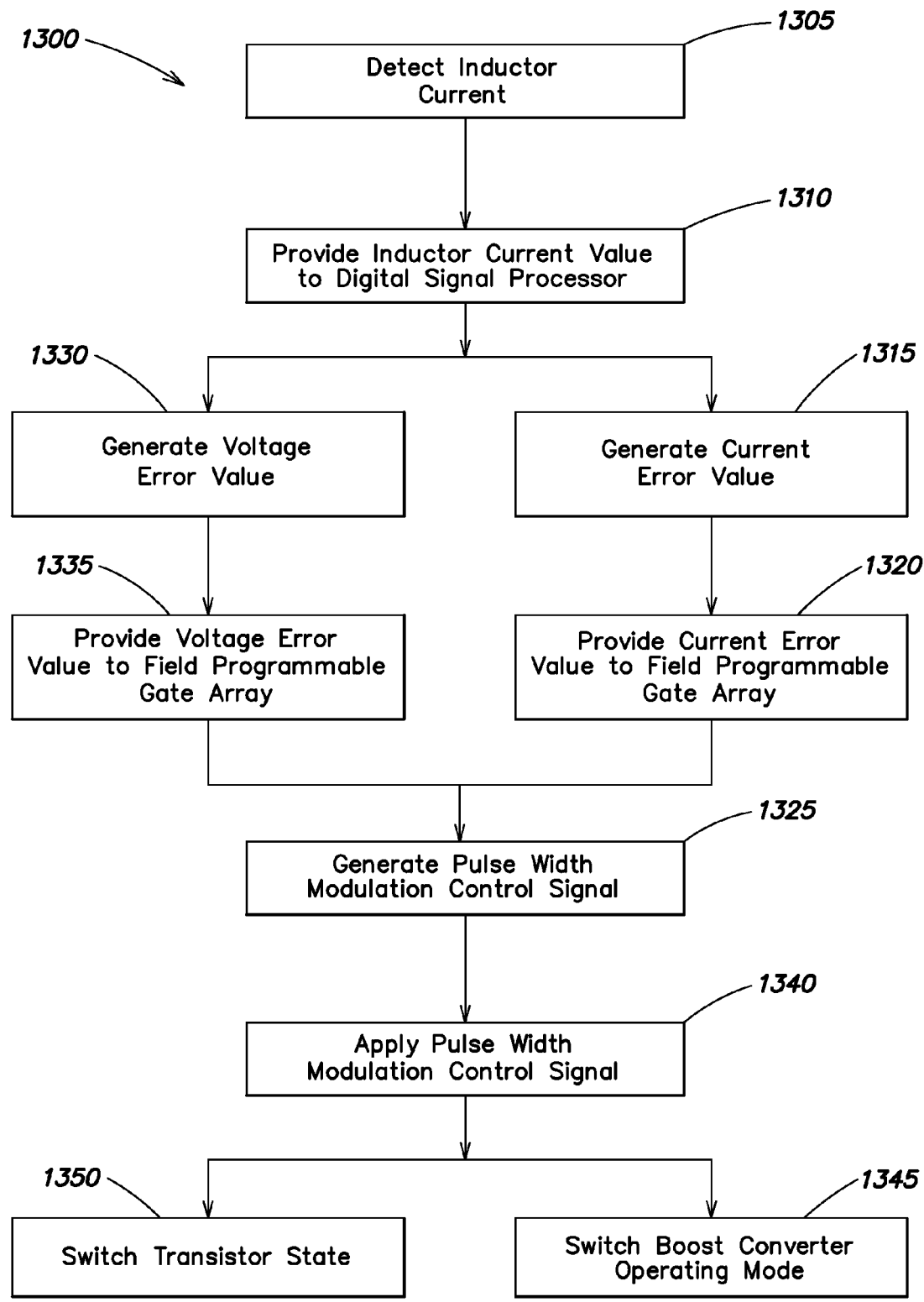
FIG. 13 is a flow chart depicting a method of operating an uninterruptable power supply in accordance with an embodiment of the invention.

FIG. 13 is a flow chart depicting a method 1300 of operating a system such as an uninterruptable power supply in accordance with an embodiment. In one embodiment, method 1300 includes a method for operating an uninterruptable power supply that has at least one input circuit, a plurality of transistors, and at least one controller. The controller may include at least one digital signal processor, and at least one field programmable gate array.

In one embodiment, method 1300 includes an act of detecting inductor current of the input circuit (ACT 1305). For example, detecting inductor current (ACT 1305) may include detecting or sensing inductor current at various points of the input circuit. For example, detecting inductor current (ACT 1305) may include detecting current at inductors of single or three phase rectifiers, or at other points of the input circuit, such as a portion of a three phase rectifier circuit located between rectifying and output diodes, where detecting inductor current (ACT 1305) can include detecting current from more than one inductor. For example, an input circuit can include two boost converter circuits, which may be referred to as positive and negative (e.g., buck) boost converters. In this example, a current sensor may detect inductor current (ACT 1305) of the boost converter circuits of the input circuit.

In one embodiment, method 1300 includes an act of providing a detected inductor current value to a controller (ACT 1310). Providing the detected inductor current value (ACT 1310) in one embodiment includes providing the detected inductor current value to a digital signal processor. This current value may be provided (ACT 1310) to a digital signal processor, digital logic device, controller, processor, logic circuit or other device configured for electronic communication with a current sensor or other device that detects input circuit current values including inductor current.

Method 1300 includes an act of generating a current error value (ACT 1315). In one embodiment, generating the current error value (ACT 1315) includes generating the current error value based at least in part on the detected inductor current value. For example, generating the current error value (ACT 315) can include determining the difference between the detected or measured inductor current value (ACT 1305) and a current reference value that was generated, for example, by the digital signal processor associated with the controller.

In one embodiment, method 1300 includes an act of providing the current error value to the controller (ACT 1320). Providing the current error value (ACT 1320) in one embodiment includes providing the current error value to a field programmable gate array. The current error value can be provided (ACT 1320) to a field programmable gate array, digital logic device, controller, processor, logic circuit or other device configured for electronic communication with, for example, a digital signal processor or other device that generates current error values (ACT 1315).

Method 1300 in one embodiment also includes an act of generating a pulse width modulation (PWM) control signal (ACT 1325). For example, a PWM control signal can be generated (ACT 1325) based in part on the current error value. In one embodiment, generating a PWM control signal (ACT 1325) includes generating a plurality of PWM control signals, such as first and second pulse width modulation control signals.

In one embodiment, generating a pulse width modulation control signal (ACT 1325) includes generating a plurality of PWM control signals independently of each other. For example, generating a pulse width modulation control signal (ACT 1325) may include generating a first PWM control signal for a first boost converter of the input circuit, and generating a second PWM control signal for a second boost converter of the input circuit. In this example, the first and second PWM control signals may be generated independently based on, for example, different inductor currents, different current error values, or other different characteristics between a plurality of boost converters (including buck-boost converters) that form part of at least one input circuit.

Method 1300 includes acts of generating a voltage error value (ACT 1330) such as the difference between an actual and desired output voltage and providing this voltage error value (ACT 1335) to the controller or an associated component such as a field programmable gate array. For example, generating the voltage error value (ACT 1330) may include the use of a digital signal processor, and the voltage error value may be provided (ACT 1335) to a field programmable gate array, digital logic device, controller, processor, logic circuit or other device configured for electronic communication with, for example, a digital signal processor or other device that generates voltage error value (ACT 1330).

In one embodiment, method 1300 includes an act of applying the pulse width modulation control signal (ACT 1340). For example, applying the PWM control signal (ACT 1340) may include applying the PWM control signal to at least one transistor that forms part of the input circuit to control a switching frequency. The transistor to which the PWM control signal may be applied (ACT 1340) can be a transistor that forms part of a boost converter of the input circuit, and the transistor may form part of a switch driven by a gate drive that is in communication with controller or other device such as a field programmable gate array.

In one embodiment, applying the PWM control signal (ACT 1340) includes applying the PWM modulation control signal to one of a first transistor and a second transistor in the input circuit to control its switching frequency. In various embodiments, the frequency may be controlled to remain inaudible to humans, (e.g., above 20 kHz) below a maximum threshold (e.g., less then 130 kHz or less then 80 kHz) or within a given range.

In some embodiments, different PWM control signals can be applied to different transistors. For example, applying the PWM control signal (ACT 1340) may include applying a first PWM control signal to a first transistor that may form part of a first boost converter circuit, and applying a second PWM control signal to a second transistor that may form part of a second boost converter circuit. (Boost converter circuits and portions thereof may also be referred to simply as boost converters.) In one embodiment, method 1300 includes an act of switching a mode of operation of a boost converter (ACT 1345). For example, applying the PWM control signal (ACT 1340) includes applying the PWM control signal to a transistor to switch the mode of operation of the boost converter circuit (ACT 1345) associated with that transistor. For example, boost converters may operate in a continuous mode, where the inductor current in the boost converter remains above zero during a line cycle. Boost converters may also operate in a discontinuous mode where the inductor current falls to and remains at zero for longer than a minimum time period. Additionally, boost converters may operate in a just-discontinuous mode, where inductor current in the boost converter falls to and reaches zero, but does not remain at zero for an operationally significant period of time. For example, in just-discontinuous operation, the PWM control signal can instruct the transistor to enter an ON state when the inductor current is determined to be zero. In this example, this causes inductor current to ramp up, as illustrated in FIGS. 7-9.

Continuing, in one embodiment, applying the PWM control signal (ACT 1340) includes applying at least one PWM control signal to at least one transistor to reversibly switch a mode of operation of a boost converter (ACT 1345) that includes the transistor between continuous and just discontinuous modes of operation. In this embodiment, inductor current does not remain at zero for an operationally significant period of time during a line cycle.

Boost converters may switch modes of operation during various parts of a line cycle. For example, an input circuit that includes a three phase rectifier may operate during a 0-360 AC line cycle, referred to simply as a line cycle. In one embodiment, switching boost converter operating mode (ACT 1345) includes switching the mode of operation of a boost converter from variable frequency just-discontinuous operation to fixed frequency continuous operation during a 0-60 degree phase angle portion of the line cycle. In some embodiments, switching boost converter operating mode (ACT 1345) may also include controlling transistor switching to operate a boost converter in a variable frequency just-discontinuous mode of operation during 0-60, 120-240, and 300-360 degree phase angle portions of the line cycle. Switching boost converter operating mode (ACT 1345) may also include controlling transistor switching to operate a boost converter in a fixed frequency (e.g., 80 kHz, 90 kHz, or 130 kHz) continuous mode of operation during 60-120 and 240-300-360 degree phase angle portions of the line cycle.

In one embodiment, method 1300 includes an act of switching a transistor (ACT 1350) to an ON state when the detected current value is zero or substantially zero. Switching the transistor state (ACT 1350) may include adjusting the duty cycle of the PWM control signal to drive transistor switching. For example, switching transistor state (ACT 1350) may include adjusting a PWM control signal applied to a transistor (ACT 1340) to reversibly switch at least one transistor between ON and OFF states. In one embodiment, when zero inductor current is detected (ACT 1305), a PWM signal is generated (ACT 1325) and applied to a transistor (ACT 1340) to instruct that transistor to enter an ON state (ACT 1350), causing current to ramp up from zero.

In one embodiment, the operating, or switching, frequency of an input circuit (or some of its components such as boost converters and transistors) (ACTS 1345, 1350) can be variable during just-discontinuous operation and fixed during continuous operation. In some embodiments, applying the PWM control signal (ACT 1340) to the transistor can reversibly switch input circuit operation between any of the continuous, discontinuous, or just-discontinuous modes of operation.

Note that in FIGS. 1 through 13, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both), nonvolatile memory, tape, a system memory, and a computer hard drive.

From the foregoing, it will be appreciated that the systems and methods to operate uninterruptable power supplies and other systems afford a simple and effective way to control input circuit operating frequency. Systems and methods according to various embodiments are able to transition transistor states and control boost converter circuit operation. This provides an uninterruptable power supply or other system with robust power factor correction capability and reduced total harmonic distortion.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, the systems and methods described herein are not limited to use in uninterruptable power supplies, and may be used with other power supplies and other systems generally. Also, input circuits described herein are not limited to rectifier 400. Rectifiers and circuit configurations other than rectifier 400 and input circuit 110, and embodiments described with respect to rectifier 400 and input circuit 110 may be used with other power supplies and systems. Systems and methods described herein include both single phase and three phase rectifiers. For example, single phase power factor correction rectifier topology may have a maximum switching frequency of approximately 80 kHz, or half the sampling frequency. A three phase partially decoupled power factor correction rectifier topology may have a maximum switching frequency of 130 kHz, which in one embodiment is the maximum frequency limited by rectifier switching devices. A three phase fully decoupled power factor correction rectifier topology may have a maximum switching frequency of 40 kHz, or one fourth of the sampling frequency. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:
1. An uninterruptable power supply, comprising:
an input circuit including a first transistor and a first inductor, the input circuit being configured to receive an AC voltage at an input and provide a DC voltage at an output;

a controller having a digital signal processor and a field programmable gate array, the controller being coupled to the input circuit to detect inductor current and to provide a detected inductor current value to the digital signal processor, the controller being configured to apply a pulse width modulation control signal to the first transistor to adjust a switching frequency of the first transistor to generate the DC voltage at the output; and wherein the first transistor forms part of a first boost converter circuit;

wherein the second transistor forms part of a second boost converter circuit;

wherein the input circuit includes a three phase rectifier;

wherein the controller is further configured to apply the pulse width modulation control signal to the first transistor to switch a mode of operation of the first boost converter circuit between variable frequency just-discontinuous and fixed frequency continuous modes of operation during a first portion of a line cycle; and the controller is further configured to apply a second pulse width modulation control signal to the second transistor to switch a mode of operation of the second boost converter circuit between variable frequency just-discontinuous and fixed frequency continuous modes of operation during a second portion of the line cycle.

2. The uninterruptable power supply of claim 1, wherein:
the digital signal processor is configured to generate a current error value based in part on the detected inductor current value and to provide the current error value to the field programmable gate array; and
the field programmable gate array is configured to generate the pulse width modulation control signal based in part on the current error value.

3. The uninterruptable power supply of claim 1, wherein in one mode the first boost converter circuit operates in the variable frequency just-discontinuous mode of operation, and the second boost converter circuit simultaneously operates in the fixed frequency continuous mode of operation.

4. The uninterruptable power supply of claim 1, the controller is further configured to apply the pulse width modulation control signal to one of the first transistor and the second transistor to reversibly switch the mode of operation of one of the first boost converter circuit and the second boost converter circuit between variable frequency just-continuous and fixed frequency continuous modes of operation based on a detected phase angle of the line cycle.

5. The uninterruptable power supply of claim 4, wherein at least one of the first transistor and the second transistor switches to an on state when the detected inductor current value falls to substantially zero.

6. The uninterruptable power supply of claim 4, wherein:
the three phase rectifier is configured for operation during a line cycle having a first phase voltage, a second phase voltage, and a third phase voltage; and the controller is further configured to switch the operating mode of one of the first boost converter circuit and the second boost converter circuit during a part of the line cycle where each of the first phase voltage, the second phase voltage, and the third phase voltage are mutually exclusive.

7. The uninterruptable power supply of claim 1, wherein:
the digital signal processor is further configured to generate a voltage error value based on a value of the DC voltage at the output and to provide the voltage error value to the field programmable gate array; and
the field programmable gate array is further configured to generate the pulse width modulation control signal based in part on the voltage error value.

8. The uninterruptable power supply of claim 1, wherein:
the input circuit includes a three phase rectifier; and
the switching frequency of the first transistor remains between 20 kHz and 130 kHz during a line cycle of the three phase rectifier.

9. The uninterruptable power supply of claim 1, wherein:
the input circuit includes a three phase rectifier having the first inductor, a second inductor, and a third inductor; and
the detected inductor current includes current from at least two of the first inductor, the second inductor, and the third inductor.

10. The uninterruptable power supply of claim 1, wherein the first transistor is in an off state for at least a predetermined amount of time before switching to an on state.

11. The uninterruptable power supply of claim 1, wherein the first transistor is in an on state for at least a predetermined amount of time before switching to an off state.

12. The uninterruptable power supply of claim 1, wherein one of the first transistor and the second transistor reversibly switches between a plurality of on states and off states, and wherein a time period between a first on state and a subsequent on state is approximately 12.5 µs.

13. A method of operating an uninterruptable power supply including an input circuit, the input circuit having a first transistor and a first inductor, a controller having a digital signal processor and a field programmable gate array, and a second transistor, wherein the first transistor forms part of a first boost converter circuit and wherein the second transistor forms part of a second boost converter circuit, the method comprising:
detecting inductor current of the input circuit;
providing a detected inductor current value to the digital signal processor;
generating a current error value based in part on the detected inductor current value;
providing the current error value to the field programmable gate array;
generating a pulse width modulation control signal based in part on the current error value;
applying the pulse width modulation control signal to the first transistor to control a switching frequency of one of the first transistor and the second transistor;
applying the pulse width modulation control signal to the first transistor to switch a mode of operation of the first boost converter circuit between variable frequency just-continuous and fixed frequency continuous modes of operation during a first portion of a line cycle; and
applying a second pulse width modulation control signal to the second transistor to switch a mode of operation of the second boost converter circuit between variable frequency just-continuous and fixed frequency continuous modes of operation during a second portion of the line cycle.

14. The method of claim 13, further comprising: reversibly switching the mode of operation of one of the first boost converter and the second boost converter between variable frequency just-continuous and fixed frequency continuous modes of operation based on a detected phase angle of the line cycle.

15. The method of claim 13, further comprising:
generating a voltage error value of the input circuit;
providing the voltage error value to the field programmable gate array; and
generating the pulse width modulation control signal based in part on the voltage error value.

16. The method of claim 13, wherein the input circuit includes a three phase rectifier having a plurality of inductors including the first inductor, and wherein detecting inductor current of the input circuit further comprises:

detecting inductor current from at least two of the plurality of inductors.

17. An uninterruptable power supply, comprising:

an input circuit including a first transistor, a second transistor, and an inductor, the first transistor forming part of a first boost converter circuit, the second transistor forming part of a second boost converter circuit;

a controller having a digital signal processor and a field programmable gate array and coupled to the input circuit to detect inductor current and to provide a detected inductor current value to the digital signal processor; and means for applying a pulse width modulation control signal to one of the first transistor and the second transistor to adjust a switching frequency of one of the first transistor and the second transistor to switch a mode of operation of the first boost converter circuit between variable frequency just-discontinuous and fixed frequency continuous modes of operation during a first portion of a line cycle and to switch a mode of operation of the second boost converter circuit between variable frequency just-discontinuous and fixed frequency continuous modes of operation during a second portion of a line cycle.

18. The uninterruptable power supply of claim 17, wherein the means for applying the pulse width modulation control signal further comprises means for:

generating a current error value based in part on the detected inductor current value and to provide the current error value to the field programmable gate array;

limiting the switching frequency between an upper frequency and a lower frequency; and generating the pulse width modulation control signal based in part on the current error value.

\* \* \* \* \*